US011075673B2

(12) United States Patent
Raghavan et al.

(10) Patent No.: US 11,075,673 B2
(45) Date of Patent: Jul. 27, 2021

(54) ANTENNA ARRAY RECONFIGURATION AT BOTH ENDS OF A MILLIMETER WAVE LINK

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Yu-Chin Ou, San Diego, CA (US); Kobi Ravid, Closter, NJ (US); Ozge Koymen, Princeton, NJ (US); Juergen Cezanne, Ocean Township, NJ (US); Junyi Li, Chester, NJ (US); Kapil Gulati, Hillsborough, NJ (US); Jung Ho Ryu, Fort Lee, NJ (US); Tianyang Bai, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/692,916

(22) Filed: Nov. 22, 2019

(65) Prior Publication Data

US 2021/0159946 A1 May 27, 2021

(51) Int. Cl.
*H04B 7/04* (2017.01)
*H04B 7/0404* (2017.01)
*H01Q 21/06* (2006.01)
*H04B 7/06* (2006.01)
*H01Q 21/24* (2006.01)

(52) U.S. Cl.
CPC ......... *H04B 7/0404* (2013.01); *H01Q 21/061* (2013.01); *H01Q 21/24* (2013.01); *H04B 7/0608* (2013.01)

(58) Field of Classification Search
CPC ........ H04B 7/06; H04B 7/063; H04B 7/0626; H04B 7/0469; H04B 7/0634; H04B 7/04; H04B 7/0602; H04B 7/061; H04B 7/08; H04W 16/28
See application file for complete search history.

(56) References Cited

U.S. PATENT DOCUMENTS 10,588,089 B1    3/2020  Raghavan et al.
2017/0026094 A1* 1/2017  Milleth ................. H04W 16/28
(Continued)

*Primary Examiner* — Blane J Jackson
(74) *Attorney, Agent, or Firm* — Qualcomm IP Dept.; James Hunt Yancey, Jr.

(57) ABSTRACT

Methods, systems, and devices for wireless communications are described. In some systems, a first device and a second device may communicate over a communication link using a set of antenna elements. The first device may identify one or more antenna array reconfiguration trigger conditions and may correspondingly select a first subset of antenna elements for operation. The first device may transmit a message to the second device including an indication of the antenna array reconfiguration at the first device, a request for the second device to modify the second device's antenna array configuration, or both. The second device may receive the message and, based on the indication or the request, may modify its antenna array configuration. For example, the second device may select a second subset of antenna elements based on the selected first subset of antenna elements. The devices may communicate using their modified antenna array configurations.

30 Claims, 13 Drawing Sheets

(56) References Cited

U.S. PATENT DOCUMENTS

| | | | |
|---|---|---|---|
| 2019/0044600 A1* | 2/2019 | Milleth | H04B 7/0632 |
| 2019/0199457 A1* | 6/2019 | Chopra | H04W 52/42 |
| 2020/0169312 A1* | 5/2020 | Black | H04B 7/088 |
| 2020/0205012 A1* | 6/2020 | Bengtsson | H04B 7/0413 |

* cited by examiner

ANTENNA ARRAY RECONFIGURATION AT BOTH ENDS OF A MILLIMETER WAVE LINK

FIELD OF TECHNOLOGY

The following relates generally to wireless communications and more specifically to antenna array reconfiguration at both ends of a millimeter wave (mmW) link.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A device, such as a UE or a base station, may communicate with other devices using beamforming techniques. A device may have multiple panels (e.g., antenna modules, antenna arrays) which are used to form a communication beam (e.g., a reception beam or transmission beam) to communicate with the other devices. A communication link between a first device and a second device may be associated with a link budget, which may be based on the antenna array used at each end of the link to form the communication beam. In some cases, it may be desirable for the device to operate a smaller antenna array, which may adversely affect a link margin of the link budget.

SUMMARY

The described techniques relate to improved methods, systems, devices, and apparatuses that support antenna array reconfiguration at both ends of a millimeter wave (mmW) link. Generally, the described techniques provide for power savings at a device while maintaining a link margin for wireless communications (e.g., mmW communications at relatively high frequency ranges). In some wireless communications systems, a first device and a second device may communicate over a communication link using a set of antenna elements. These devices may be user equipment (UEs), base stations, or a combination thereof communicating over sidelinks, backhaul links, access links, or the like. The first device may identify one or more antenna array reconfiguration trigger conditions and may correspondingly select a first subset of antenna elements for communication. The first device may transmit a message to the second device including an indication of the antenna array reconfiguration at the first device, a request for the second device to modify the second device's antenna array configuration, or both. The second device may receive the message and, based on the indication or the request, may modify its antenna array configuration. For example, the second device may select a second subset of antenna elements based on the first subset of antenna elements selected by the first device (e.g., to maintain a link margin between the first device and the second device). The devices may communicate using their modified antenna array configurations.

A method for wireless communications at a first device is described. The method may include selecting, from a set of antenna elements of an antenna module, a subset of antenna elements of the set of antenna elements for a communication link with a second device, transmitting, to the second device, a message indicating the selected subset of antenna elements, and communicating with the second device over the communication link using the selected subset of antenna elements and based on the message.

An apparatus for wireless communications at a first device is described. The apparatus may include a processor, memory coupled with the processor, and instructions stored in the memory. The instructions may be executable by the processor to cause the apparatus to select, from a set of antenna elements of an antenna module, a subset of antenna elements of the set of antenna elements for a communication link with a second device, transmit, to the second device, a message indicating the selected subset of antenna elements, and communicate with the second device over the communication link using the selected subset of antenna elements and based on the message.

Another apparatus for wireless communications at a first device is described. The apparatus may include means for selecting, from a set of antenna elements of an antenna module, a subset of antenna elements of the set of antenna elements for a communication link with a second device, transmitting, to the second device, a message indicating the selected subset of antenna elements, and communicating with the second device over the communication link using the selected subset of antenna elements and based on the message.

A non-transitory computer-readable medium storing code for wireless communications at a first device is described. The code may include instructions executable by a processor to select, from a set of antenna elements of an antenna module, a subset of antenna elements of the set of antenna elements for a communication link with a second device, transmit, to the second device, a message indicating the selected subset of antenna elements, and communicate with the second device over the communication link using the selected subset of antenna elements and based on the message.

In some examples of the method, apparatuses, and non-transitory computer-readable medium described herein, selecting the subset of antenna elements may include operations, features, means, or instructions for selecting the subset of antenna elements based on a link budget threshold for the communication link.

In some examples of the method, apparatuses, and non-transitory computer-readable medium described herein, transmitting the message may include operations, features, means, or instructions for transmitting a request message for the second device to modify an antenna element configuration at the second device based on the selected subset of antenna elements at the first device.

Some examples of the method, apparatuses, and non-transitory computer-readable medium described herein may further include operations, features, means, or instructions for receiving, from the second device in response to the request message, a confirmation message indicating that the second device modified the antenna element configuration at the second device based on the selected subset of antenna elements at the first device.

In some examples of the method, apparatuses, and non-transitory computer-readable medium described herein, the communicating with the second device over the communication link using the selected subset of antenna elements may be based on receiving the confirmation message.

In some examples of the method, apparatuses, and non-transitory computer-readable medium described herein, the request message indicates a requested number of antenna elements for the second device to use for the communication link.

In some examples of the method, apparatuses, and non-transitory computer-readable medium described herein, transmitting the message may include operations, features, means, or instructions for transmitting a capability message for the first device, where the capability message indicates that the first device is capable of operating the selected subset of antenna elements.

Some examples of the method, apparatuses, and non-transitory computer-readable medium described herein may further include operations, features, means, or instructions for dynamically selecting an antenna element capability of the first device for the capability message based on the selecting.

Some examples of the method, apparatuses, and non-transitory computer-readable medium described herein may further include operations, features, means, or instructions for determining to select the subset of antenna elements based on a power availability at the first device, a power availability at the second device, a thermal constraint at the first device, a thermal constraint at the second device, an interference constraint at the first device, an interference constraint at the second device, a power amplifier rating at the first device, a power amplifier rating at the second device, an exposure constraint at the first device, an exposure constraint at the second device, an mmW component rating at the first device, an mmW component rating at the second device, a beamwidth constraint of a beam used with the subset of antenna elements at the first device, a beamwidth constraint of a beam used with a second subset of antenna elements at the second device, an angular spread estimate of one or more dominant clusters at the first device, an angular spread estimate of one or more dominant clusters at the second device, or a combination thereof.

In some examples of the method, apparatuses, and non-transitory computer-readable medium described herein, the set of antenna elements may be controlled by a set of radio frequency integrated circuits (RFICs) for the antenna module, and selecting the subset of antenna elements may include operations, features, means, or instructions for operating a subset of RFICs of the set of RFICs to control the selected subset of antenna elements.

In some examples of the method, apparatuses, and non-transitory computer-readable medium described herein, communicating with the second device over the communication link may include operations, features, means, or instructions for receiving, from the second device, one or more messages over the communication link using the selected subset of antenna elements.

In some examples of the method, apparatuses, and non-transitory computer-readable medium described herein, a carrier frequency for the communication link may be greater than 52.6 Gigahertz (GHz).

In some examples of the method, apparatuses, and non-transitory computer-readable medium described herein, the first device and the second device include UEs, and the communication link includes a sidelink or a relay communication link.

In some examples of the method, apparatuses, and non-transitory computer-readable medium described herein, the first device and the second device include base stations, and the communication link includes a backhaul link or a relay communication link.

Another method for wireless communications at a first device is described. The method may include receiving, from a second device, a message indicating a first subset of antenna elements selected for a communication link by the second device, selecting, from a set of antenna elements of an antenna module, a second subset of antenna elements of the set of antenna elements for the communication link with the second device based on the message, and communicating with the second device over the communication link using the selected second subset of antenna elements.

An apparatus for wireless communications at a first device is described. The apparatus may include a processor, memory coupled with the processor, and instructions stored in the memory. The instructions may be executable by the processor to cause the apparatus to receive, from a second device, a message indicating a first subset of antenna elements selected for a communication link by the second device, select, from a set of antenna elements of an antenna module, a second subset of antenna elements of the set of antenna elements for the communication link with the second device based on the message, and communicate with the second device over the communication link using the selected second subset of antenna elements.

Another apparatus for wireless communications at a first device is described. The apparatus may include means for receiving, from a second device, a message indicating a first subset of antenna elements selected for a communication link by the second device, selecting, from a set of antenna elements of an antenna module, a second subset of antenna elements of the set of antenna elements for the communication link with the second device based on the message, and communicating with the second device over the communication link using the selected second subset of antenna elements.

A non-transitory computer-readable medium storing code for wireless communications at a first device is described. The code may include instructions executable by a processor to receive, from a second device, a message indicating a first subset of antenna elements selected for a communication link by the second device, select, from a set of antenna elements of an antenna module, a second subset of antenna elements of the set of antenna elements for the communication link with the second device based on the message, and communicate with the second device over the communication link using the selected second subset of antenna elements.

In some examples of the method, apparatuses, and non-transitory computer-readable medium described herein, selecting the second subset of antenna elements may include operations, features, means, or instructions for selecting the second subset of antenna elements based on a link budget threshold for the communication link and the first subset of antenna elements.

In some examples of the method, apparatuses, and non-transitory computer-readable medium described herein, receiving the message may include operations, features, means, or instructions for receiving a request message for the first device to modify an antenna element configuration at the first device based on the first subset of antenna elements, where the second subset of antenna elements may be selected based on the request message.

Some examples of the method, apparatuses, and non-transitory computer-readable medium described herein may further include operations, features, means, or instructions for transmitting, to the second device in response to the request message, a confirmation message indicating that the first device modified the antenna element configuration at the first device based on selecting the second subset of antenna elements.

In some examples of the method, apparatuses, and non-transitory computer-readable medium described herein, the request message indicates a requested number of antenna elements for the first device to use for the communication link, and the selected second subset of antenna elements includes the requested number of antenna elements.

In some examples of the method, apparatuses, and non-transitory computer-readable medium described herein, receiving the message may include operations, features, means, or instructions for receiving a capability message for the second device, where the capability message indicates that the second device is capable of operating the first subset of antenna elements.

Some examples of the method, apparatuses, and non-transitory computer-readable medium described herein may further include operations, features, means, or instructions for modifying a transmit power for the communication link based on the first subset of antenna elements and the selected second subset of antenna elements.

Some examples of the method, apparatuses, and non-transitory computer-readable medium described herein may further include operations, features, means, or instructions for communicating with the second device over the communication link using a first number of antenna elements, determining that the second device reduced a number of operating antenna elements for the communication link based on the indicated first subset of antenna elements, and selecting, for the second subset of antenna elements for the communication link, a second number of antenna elements that is greater than the first number of antenna elements based on the second device reducing the number of operating antenna elements for the communication link.

Some examples of the method, apparatuses, and non-transitory computer-readable medium described herein may further include operations, features, means, or instructions for communicating with the second device over the communication link using a first number of antenna elements, determining that the second device increased a number of operating antenna elements for the communication link based on the indicated first subset of antenna elements, and selecting, for the second subset of antenna elements for the communication link, a second number of antenna elements that is less than the first number of antenna elements based on the second device increasing the number of operating antenna elements for the communication link.

In some examples of the method, apparatuses, and non-transitory computer-readable medium described herein, the set of antenna elements may be controlled by a set of RFICs for the antenna module, and selecting the second subset of antenna elements may include operations, features, means, or instructions for operating a subset of RFICs of the set of RFICs to control the selected second subset of antenna elements.

In some examples of the method, apparatuses, and non-transitory computer-readable medium described herein, communicating with the second device over the communication link may include operations, features, means, or instructions for transmitting, to the second device, one or more messages over the communication link using the selected second subset of antenna elements.

In some examples of the method, apparatuses, and non-transitory computer-readable medium described herein, a carrier frequency for the communication link may be greater than 52.6 GHz.

In some examples of the method, apparatuses, and non-transitory computer-readable medium described herein, the first device and the second device include UEs, and the communication link includes a sidelink or a relay communication link.

In some examples of the method, apparatuses, and non-transitory computer-readable medium described herein, the first device and the second device include base stations, and the communication link includes a backhaul link or a relay communication link.

DETAILED DESCRIPTION

Figure 1:
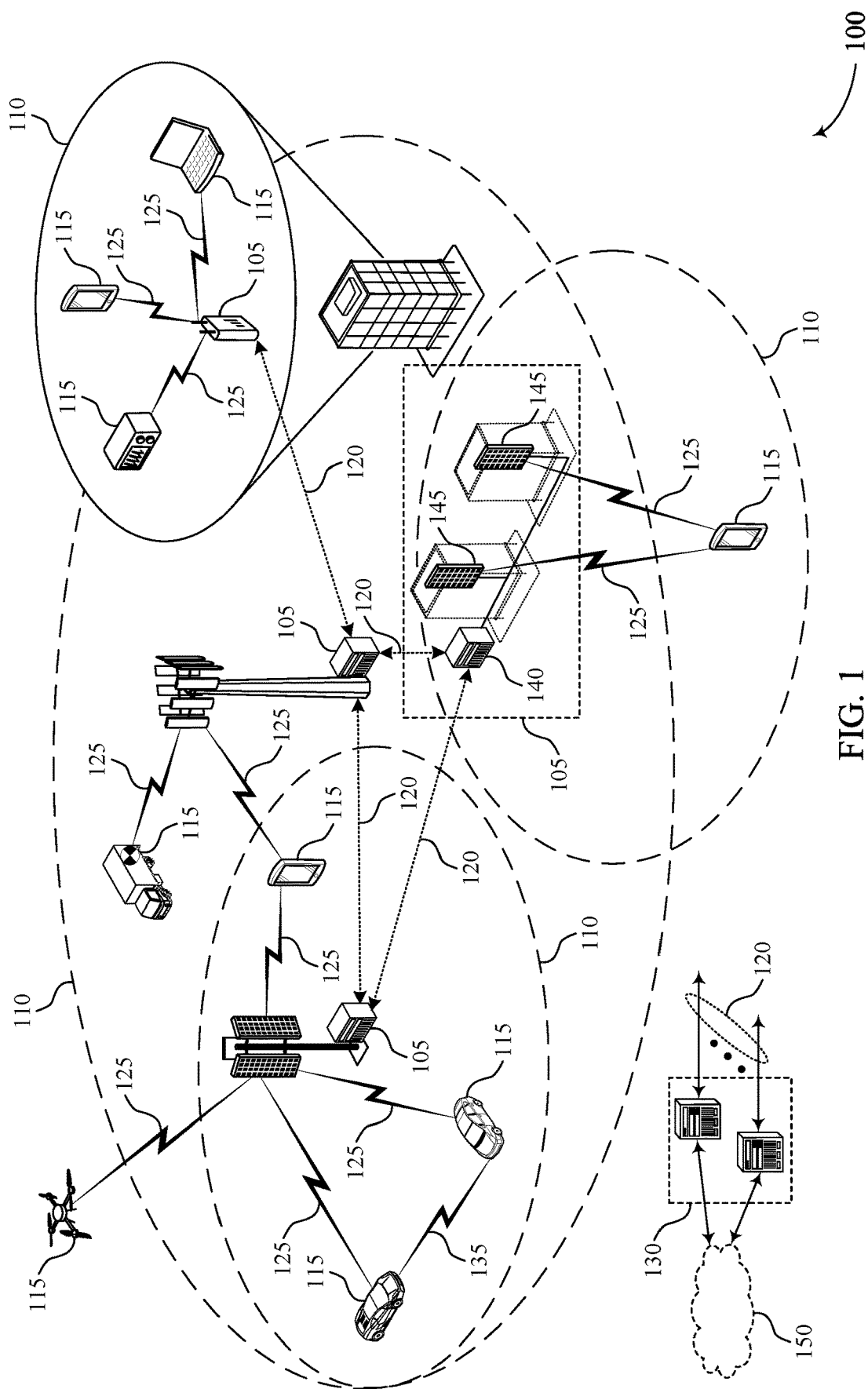
FIGS. 1 and 2 illustrate examples of wireless communications systems that support antenna array reconfiguration at both ends of a millimeter wave (mmW) link in accordance with aspects of the present disclosure.

As demand for communication resources increases due to an increasing number of wireless devices communicating over the available spectrum, techniques to efficiently and reliably increase throughput are desirable. In some cases, additional frequency ranges may be used by communicating devices, which may enable devices to achieve higher throughput. Higher frequency ranges (e.g., those above 52.6 Gigahertz (GHz)) may be implemented for wireless communications, where transmitting at these higher frequencies involves transmitting at shorter wavelengths. Such shorter wavelengths may support devices using antenna elements that are spaced closer together (e.g., as antenna element spacing may be a function of the operating wavelength). In some cases, the sizes of the antenna modules containing the antenna elements may remain unchanged to enable a device to support operations at multiple frequency bands (e.g., supporting communications at lower frequency bands, such as equal to or below 52.6 GHz, and higher frequency bands, such as above 52.6 GHz). As such, more antenna elements may be packed on an antenna module of a device equipped for communication at high frequencies than on an antenna module of a device not equipped for communication at these high frequencies.

However, operating a large number of antenna elements may have significant power costs. To reduce the power overhead associated with communicating at high frequencies, a device may select to operate a subset of its antenna elements. While this may lower power and processing costs on one end of the communication link, operating a smaller number of antenna elements (e.g., a smaller antenna array) may adversely affect a link margin of a communication link between two communicating devices. For example, when one device switches to using a smaller antenna array (e.g., from using a relatively larger antenna array) for communications with another device, the received signal strengths of transmissions on the communication link may decrease. This may cause the link margin of the link budget of the communication link to decrease. In some cases, if the received signal strengths of transmissions decrease a threshold amount, the link margin may become insufficient, which may be associated with an increase in communication failures across the communication link as signals are not received with a sufficient signal strength (e.g., a received signal strength above a threshold signal strength for reliable reception).

If a first device (e.g., a user equipment (UE) or base station) determines to reduce the size of its antenna array (e.g., due to a power constraint or some other factor), the first device may send an array indication message to a second device (e.g., another UE or base station) to inform the second device of the antenna array size selected by the first device, to request the second device to modify the second device's antenna array size, or both. In some examples, the array indication message may include an indication of the antenna array size of the first device. Based on receiving the indication of the antenna array size of the first device, the second device may select an antenna element configuration based on the antenna array size of the first device (e.g., in order to maintain the link margin). In some other examples, the array indication message may include a request for the second device to modify the second device's antenna array size. Based on receiving the request from the first device, the second device may determine whether to accept or decline the request. In cases where the second device determines to accept the request, the second device may transmit a confirmation message to the first device indicating that the second device has modified its antenna array size as requested. Based on receiving the confirmation message, the first device may operate using its selected antenna array. By transmitting an indication of an antenna array size selected for operation during subsequent communications, two communicating devices may more efficiently use the available resources on both ends of a communication link while maintaining the link margin.

In some implementations, the first device may determine to select an antenna array size and transmit the array indication message to the second device based on the first device determining that one or more conditions are met. These conditions may include any parameters or triggers that can influence the antenna array size implemented by the first device, the second device, or both. In one example, a condition that may trigger the first device to transmit an array indication message may include determining a power availability of the first device, the second device, or both. In some examples, the first device may determine that the first device is power limited and that the second device is not power limited, and the first device may accordingly transmit an array indication to the second device either indicating an increased antenna array size for the second device or requesting the second device to operate using an increased antenna array size.

Particular aspects of the subject matter described herein may be implemented to realize one or more advantages. The described techniques may support more efficient use of resources (e.g., at higher frequencies) during communications using reception and transmission beams. Furthermore, a wireless device may achieve power savings by selecting a subset of antenna elements for communication with a second wireless device over a communication link. The wireless device may transmit an array indication message indicating the change in the size of the operating antenna array, and the second wireless device may maintain reliable communications by modifying its antenna array size accordingly (e.g., to maintain a link budget). As such, supported techniques may include improved network operations and efficiencies, among other benefits.

Aspects of the disclosure are initially described in the context of wireless communications systems. Additional aspects are described with reference to device configurations and a process flow. Aspects of the disclosure are further illustrated by and described with reference to apparatus diagrams, system diagrams, and flowcharts that relate to antenna array reconfiguration at both ends of a millimeter wave (mmW) link.

FIG. 1 illustrates an example of a wireless communications system 100 that supports antenna array reconfiguration at both ends of an mmW link in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio aframes each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, a first device (e.g., a UE 115 or a base station 105) may communicate with a second device via a communication link (e.g., one of backhaul links 120, access links such as communication links 125, or sidelinks such as communication links 135) using beamforming techniques as described herein. These devices may be examples of UEs 115 operating at upper mmW bands, base stations 105 operating at upper mmW bands, customer premises equipment (CPEs) operating at upper mmW bands, or some combination of these or other similar devices. In some examples, the transmitting device and the receiving device may have symmetric or nearly symmetric antenna array capabilities. For example, the devices may be UEs 115 in a sidelink or relay setup, base stations 105 in a backhaul setup, devices communicating in a private network, industrial IoT devices, or some similar combination of devices.

The first device may be configured with one or more antenna modules and each of the one or more antenna modules may include a set of antenna elements that may support communication using transmission or reception beams. In some cases, the first device may select a subset of antenna elements of the set of antenna elements to operate for communications with the second device. The first device may determine to select the subset of antenna elements based on a condition at the first device (e.g., a power availability, a thermal condition, etc.). The first device may transmit a message indicating the selected subset of antenna elements to the second device. Based on the indication, the second device may correspondingly select a subset of antenna elements for operation from a set of antenna elements configured at the second device.

The communication link between the first device and the second device may be associated with a link budget, and the first device and the second device may select their respective subsets of antenna elements based on maintaining the link margin of the link budget (e.g., based on a link budget threshold for the communication link). That is, the devices may implement a "sufficient" link budget if an estimated received power for a signal is great enough for successful reception (e.g., based on a receiver sensitivity), where the link margin measures the amount by which the received power exceeds the receiver sensitivity. In an example, the first device may determine to select a subset of antenna elements (e.g., the first device may reduce a number of operating antenna elements) due to identifying a condition at the first device (e.g., the power availability at the first device falls below a threshold power availability, etc.). The first device may transmit a message to the second device including an indication of the subset of antenna elements that the first device selected to operate, an indication to the second device to operate a particular subset of antenna elements, or a combination thereof. Based on receiving the message, the second device may select a subset of antenna elements based on the indication in the message. In some examples the first device may select to decrease a number of operating antenna elements for communications with the second device, and the second device may correspondingly select to increase a number of operating antenna elements for the communications based on the link margin (e.g., in order to maintain the link margin or, correspondingly, maintain a link budget threshold).

Figure 2:
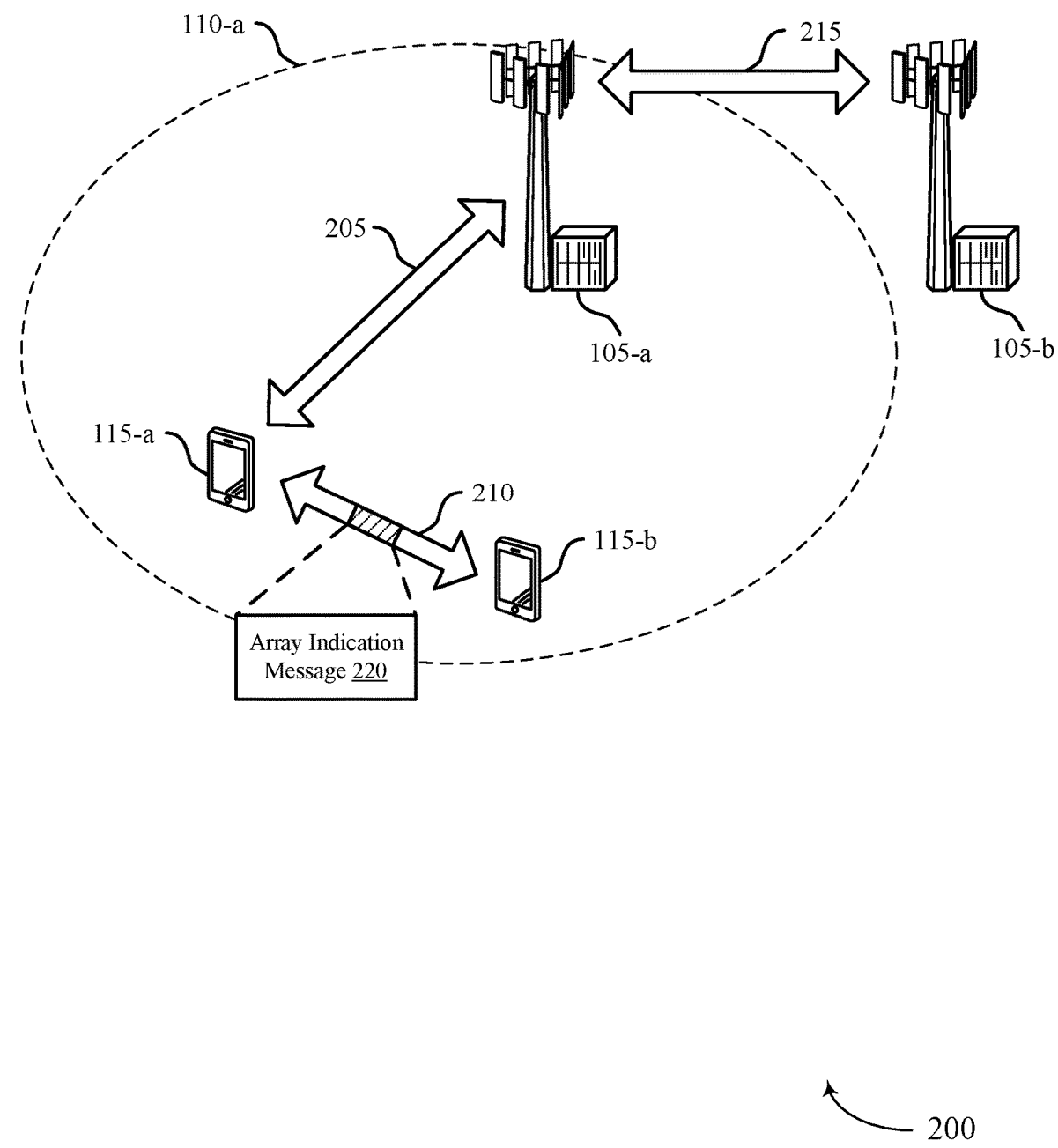

FIG. 2 illustrates an example of a wireless communications system 200 that supports antenna array reconfiguration at both ends of an mmW link in accordance with aspects of the present disclosure. In some examples, wireless communications system 200 may implement aspects of wireless communications system 100. In some cases, wireless communications system 200 may include a UE 115-a, a UE 115-b, a base station 105-a, and a base station 105-b, which may be examples of UEs 115 and base stations 105 described with reference to FIG. 1. Base station 105-a may be associated with coverage area 110-a, which may correspond to the area in which the base station 105-a may serve one or more UEs 115. Base station 105-a may communicate with one or more UEs 115 (e.g., UE 115-a, UE 115-b, or both) using an access link 205. Additionally, wireless communications system 200 may support communications between two base stations 105. For example, base station 105-a may communicate with base station 105-b using a backhaul link 215. UE 115-a and UE 115-b may both support sidelink communication capabilities and may communicate using a sidelink 210. In some cases, access link 205, sidelink 210, and backhaul link 215 may be examples of relay links, private network links, industrial IoT communication links, or other similar communication links.

A wireless communications system, such as wireless communications system 200, may support access links 205, backhaul links 215, and sidelinks 210 for communications between wireless devices. An access link 205 may refer to a communication link between a UE 115 and a base station 105. For example, an access link 205 may support uplink signaling, downlink signaling, connection procedures, etc. Backhaul links 215 and sidelinks 210 may refer to communication links between similar wireless devices, where a backhaul link 215 refers to a communication link between base stations 105 and a sidelink 210 refers to a communication link between UEs 115.

UE 115-a, UE 115-b, base station 105-a, and base station 105-b may all be example devices capable of transmitting and/or receiving an array indication message 220 to indicate a selected subset of antenna elements. Although illustrated as being transmitted over sidelink 210, an array indication message 220 may be transmitted and/or received over an access link 205, a backhaul link 215, a sidelink 210, or any other type of communication link. Further, although examples herein are described in the context of sidelink 210 communications between UE 115-*a* and UE 115-*b*, the techniques described are equally applicable to the context of access link 205 communications between UE 115-*a* and base station 105-*a* and backhaul link 215 communications between base station 105-*a* and base station 105-*b*.

In some cases, UE 115-*a* and UE 115-*b* may be symmetric or almost symmetric devices, such that both UE 115-*a* and UE 115-*b* may have similar antenna configurations (e.g., a similar number of antenna modules and/or number of antenna elements on each antenna module). UE 115-*a* and UE 115-*b* may both be configured with one or more antenna modules and each antenna module may include a set of antenna elements.

Sidelink 210 may be associated with a link budget and a corresponding link margin (e.g., where the link margin may be maintained above a link budget threshold). The link budget, link margin, or both may be based on a received power and on the effective isotropically radiated power (EIRP) at both ends of the sidelink 210. The EIRP may be based on the antenna array gains of each of the endpoints of the communication link (e.g., UE 115-*a* and UE 115-*b*), which may be based on the number of antenna elements (e.g., the antenna array size) that UE 115-*a* and UE 115-*b* use for transmission and/or reception. Increasing the number of operating antenna elements for communication on sidelink 210 at the UE 115-*a* and/or the UE 115-*b* may increase the EIRP at both ends of the link and may accordingly increase the link margin. Likewise, decreasing the number of operating antenna elements at the UE 115-*a* and/or the UE 115-*b* may decrease the link margin. In some cases, a lower link margin may be associated with a lower EIRP and may result in more communication failures than a higher link margin associated with a higher EIRP. As such, operating more antenna elements (e.g., larger antenna arrays) of an antenna module may increase the achievable EIRP of a communication link.

In some cases, the UE 115-*a* or UE 115-*b* may identify a condition (e.g., a limiting condition that limits the number of operating antenna elements for a UE 115) and may select to operate a subset of antenna elements—switching the operating antenna array at the UE 115—based on the condition. Conditions triggering an antenna array switch, such as power availability, may include any condition that may influence the antenna element configuration of a device and may not be constrained to limiting conditions (e.g., based on a condition, a UE 115-*a* may increase its operating number of antenna elements). Conditions may include, but are not limited to, a power availability at the UE 115-*a*, a power availability at the UE 115-*b*, a thermal constraint at the UE 115-*a*, a thermal constraint at the UE 115-*b*, an interference constraint at the UE 115-*a*, an interference constraint at the UE 115-*b*, a power amplifier rating at the UE 115-*a*, a power amplifier rating at the UE 115-*b*, a differential power amplifier rating between the UE 115-*a* and the UE 115-*b*, an exposure constraint (e.g., a maximum permissible exposure constraint, such as a power density exposure (PDE) constraint) at the UE 115-*a*, an exposure constraint (e.g., a maximum permissible exposure constraint, such as a PDE constraint) at the UE 115-*b*, an mmW component rating at the UE 115-*a*, an mmW component rating at the UE 115-*b*, a beamwidth constraint at the UE 115-*a* for a beam used with the subset of antenna elements operated by the UE 115-*a*, a beamwidth constraint at the UE 115-*b* for a beam used with the subset of antenna elements operated by the UE 115-*b*, an angular spread estimate of the dominant clusters at the UE 115-*a* (e.g., one or more clusters of devices with which UE 115-*a* transmits and/or receives messages), and an angular spread estimate of the dominant clusters at the UE 115-*b*. The conditions may apply to either the UE 115-*a* or the UE 115-*b*, or both, and the UE 115-*a* and/or the UE 115-*b* may identify that any number of the conditions may apply in combination.

In the examples described herein, the UE 115-*a* may determine that a condition applies to the antenna element configuration of the UE 115-*a* while communicating with UE 115-*b* (e.g., after a communication link has already been established between UE 115-*a* and UE 115-*b*). The UE 115-*a* may determine to modify (e.g., increase or decrease) the number of operating antenna elements accordingly for the communication link. As such, the UE 115-*a* may select a subset of antenna elements of a set of antenna elements of an antenna module of the UE 115-*a* and may communicate with UE 115-*b* by operating the selected subset of antenna elements (e.g., transmitting using the selected subset of antenna elements, receiving using the selected subset of antenna elements, etc.).

Additionally or alternatively, the UE 115-*a* may determine if a condition applies to the UE 115-*b* and the UE 115-*a* may modify its antenna element configuration accordingly. For example, UE 115-*a* may determine that the UE 115-*b* has a greater power availability than the UE 115-*a*. In such examples, the UE 115-*a* may select a reduced subset of antenna elements and may transmit a message to the UE 115-*b* to request the UE 115-*b* to increase the number of antenna elements that the UE 115-*b* is operating based on the UE 115-*b* having a greater power availability. The UE 115-*a* may decrease its number of operating antenna elements if the UE 115-*a* has, as compared to the UE 115-*b*, a lower (e.g., more restrictive) thermal constraint, a more concentrated local geometry, a lower power amplifier rating, a lower (e.g., more restrictive) exposure constraint, a wider angular spread, or some combination of these parameters. Similarly, the UE 115-*a* may decrease its number of operating antenna elements if the UE 115-*b* has, as compared to the UE 115-*a*, a higher (e.g., less strict) thermal constraint, a sparser local geometry (e.g., less clutter), a higher power amplifier rating, a higher (e.g., less restrictive) exposure constraint, and/or a narrower angular spread, or any other conditions that may influence the antenna element configuration of either the UE 115-*a* or the UE 115-*b*.

In one example, the UE 115-*a* may identify a trigger condition for an antenna array switch and may select to operate a subset of antenna elements based on the condition. The UE 115-*a* may be physically configured with a set of antenna elements on an antenna module of the UE 115-*a*, but the UE 115-*a* may determine to operate a subset of the set of antenna elements. For example, the UE 115-*a* may determine to operate the subset of antenna elements based on the power availability at the UE 115-*a* or to conserve power (e.g., enter a power save mode). The UE 115-*a* may power down—or otherwise not operate—the remaining antenna elements of the set of antenna elements based on the selection, effectively conserving power at the UE 115-*a*. In some cases, the operating subset of antenna elements may form a smaller sized antenna array than the antenna array that the UE 115-*a* operated prior to identifying the limiting condition, reducing the antenna gain associated with the UE 115-*a* and adversely affecting the link margin of sidelink 210. In some examples, operating the subset of antenna elements may result in a failure to maintain the link margin of sidelink 210. As such, the UEs 115-*a* and 115-*b* may experience an increase in communication failures if the UE 115-*a* reduces the operating antenna array size without any change at the UE 115-*b*.

In some examples of the techniques described herein, the UE 115-*a* may send a message (e.g., an array indication message 220) to the UE 115-*b* indicating the antenna array reconfiguration at the UE 115-*a*. Based on receiving the array indication message 220, the UE 115-*b* may identify the number of antenna elements (e.g., the antenna array size) the UE 115-*a* is operating or requesting to operate. By communicating this information between the UEs 115, one UE 115 (e.g., UE 115-*b*) may react to the antenna array reconfiguration at the other UE 115 (e.g., UE 115-*a*) in order to maintain a link margin and mitigate communication failures due to the reconfiguration. The array indication message 220 may be transmitted statically (e.g., sent once at the beginning of communications over sidelink 210) or may be transmitted dynamically (e.g., may be transmitted periodically or aperiodically as conditions change at either the UE 115-*a* or the UE 115-*b*). The array indication message 220 may be sent over sidelink 210 and may support more flexible antenna configurations (e.g., more degrees of freedom in terms of antenna array arrangement, placement, and selection) and a more efficient usage of resources at both ends of sidelink 210. For example, when two communicating devices collaborate on their operating antenna element configurations, the devices may more efficiently communicate based on the unique conditions at each end of the communication link.

In some cases, the array indication message 220 may be an example of a request message. For example, in addition or alternative to indicating the antenna reconfiguration at the UE 115-*a*, the array indication message 220 may request the UE 115-*b* to modify the antenna element configuration of the UE 115-*b*. In some examples, the UE 115-*a* may determine to reduce its operating number of antenna elements and the array indication message 220 may request the UE 115-*b* to increase its operating number of antenna elements (e.g., to operate at a greater antenna array size). Based on collaborating on antenna element configurations, the UE 115-*a* and the UE 115-*b* may more efficiently use the resources at both ends of sidelink 210.

The UE 115-*b* may receive the array indication message 220 (e.g., a request) and may determine to modify its antenna element configuration according to the request. In some examples, the UE 115-*b* may determine to modify its antenna element configuration according to the request and may send a confirmation message to the UE 115-*a* based on agreeing to the request. In some examples, the array indication message 220 may indicate that the UE 115-*a* is operating a reduced number of antenna elements (e.g., using a bit to indicate the decrease in the number of antenna elements, a bit field to indicate the particular reduced number of antenna elements, a bit field to indicate a particular subset of selected antenna elements, or some combination thereof). In such examples, by agreeing to the array indication message 220, the UE 115-*b* may determine to increase its number of operating antenna elements (e.g., to compensate for the smaller antenna array size of UE 115-*a*). Based on receiving the confirmation, the UE 115-*a* may determine that it may operate the reduced number of antenna elements without adversely affecting the link margin of sidelink 210.

In other examples, the UE 115-*b* may determine not to modify its antenna element configuration according to the array indication message 220 and may refrain from sending a confirmation message. Alternatively, the UE 115-*b* may transmit a rejection message to the UE 115-*a* based on determining not to modify its antenna element configuration according to the request. In such examples, the UE 115-*b* may have a limiting condition that restricts the UE 115-*b* from modifying its current antenna element configuration. In some illustrative examples, the UE 115-*b* may be power limited or may determine to communicate using a wider angular spread (e.g., UE 115-*b* may be in a broadcast mode and increasing the number of antenna elements the UE 115-*b* operates may reduce the angular spread of its broadcast messages). Based on not receiving the confirmation message or receiving the rejection message, the UE 115-*a* may determine to resume operating an initial antenna element configuration (e.g., UE 115-*a* may not reduce its number of operating antenna elements). Alternatively, based on not receiving the confirmation message or receiving the rejection message, the UE 115-*a* may determine whether to operate using its selected subset of antenna elements based on the effect the smaller antenna array size may have on the link margin. In some examples, the UE 115-*a* may determine the link margin remains above a link budget threshold even with the smaller antenna array, and the UE 115-*a* may determine to operate the selected subset of antenna elements even if the UE 115-*b* declines the request. In other examples, the UE 115-*a* may determine that by operating the selected subset of antenna elements—with no change in antenna array size at the UE 115-*b*—the link margin falls below the link budget threshold. In such examples, the UE 115-*a* may determine to resume operating the initial antenna element configuration (e.g., UE 115-*a* may not reduce its number of operating antenna elements).

In some cases, array indication message 220 may be a capability message. The capability message may be an operational capability message and may indicate a number of antenna elements that the UE 115-*a* is capable of operating, which may be different than the number of antenna elements with which the UE 115-*a* is physically configured. For example, the UE 115-*a* may indicate, via array indication message 220, that the UE 115-*a* is capable of operating a number of antenna elements based on a limiting condition. This indicated number may be less than the number of antenna elements currently operated by the UE 115-*a* (e.g., if the UE 115-*a* selects to decrease its number of operating antenna elements). The UE 115-*b* may receive the capability message and may determine to modify its antenna element configuration based on the capability message in the array indication message 220.

The array indication message 220 may include an antenna element configuration (e.g., a number of antenna elements or an antenna array size) that the UE 115-*a* is operating. Additionally or alternatively, the array indication message 220 may include an antenna element configuration (e.g., a number of antenna elements or an antenna array size) that the UE 115-*b* may operate to maintain the link margin of sidelink 210. The array indication message 220 may further include other information, such as information related to the link budget of sidelink 210 (e.g., a transmit power, a path loss, etc.).

In examples where the array indication message 220 includes the antenna element configuration of the UE 115-*a*, but not an antenna element configuration for the UE 115-*b*, the UE 115-*b* may determine, based on the antenna element configuration of the UE 115-*a*, the antenna element configuration that the UE 115-*b* may operate to maintain the link margin. As such, the UE 115-*b* may use the antenna element configuration of the UE 115-*a* (e.g., the antenna array size) and determine the antenna array gain of the UE 115-*a*. The UE 115-*b* may calculate the antenna element configuration that the UE 115-*b* may operate to maintain the link margin based calculating the link budget of sidelink 210. For example, the UE 115-*b* may determine a threshold antenna array gain of the UE 115-*b* based on the antenna array gain of the UE 115-*a*, a transmit power, a path loss, and/or other information related to the calculation of the link budget in order to maintain the link margin. The UE 115-*b* may determine an antenna element configuration (e.g., an antenna array size) based on the calculated threshold antenna array gain. In some cases, the determined antenna element configuration may be based on a desired beam direction. Alternatively, the UE 115-*a* may perform similar calculations on its end of the link and may transmit, as part of the array indication message 220, an indication of the antenna element configuration for the UE 115-*b* to operate that may maintain the link margin.

Figure 3:
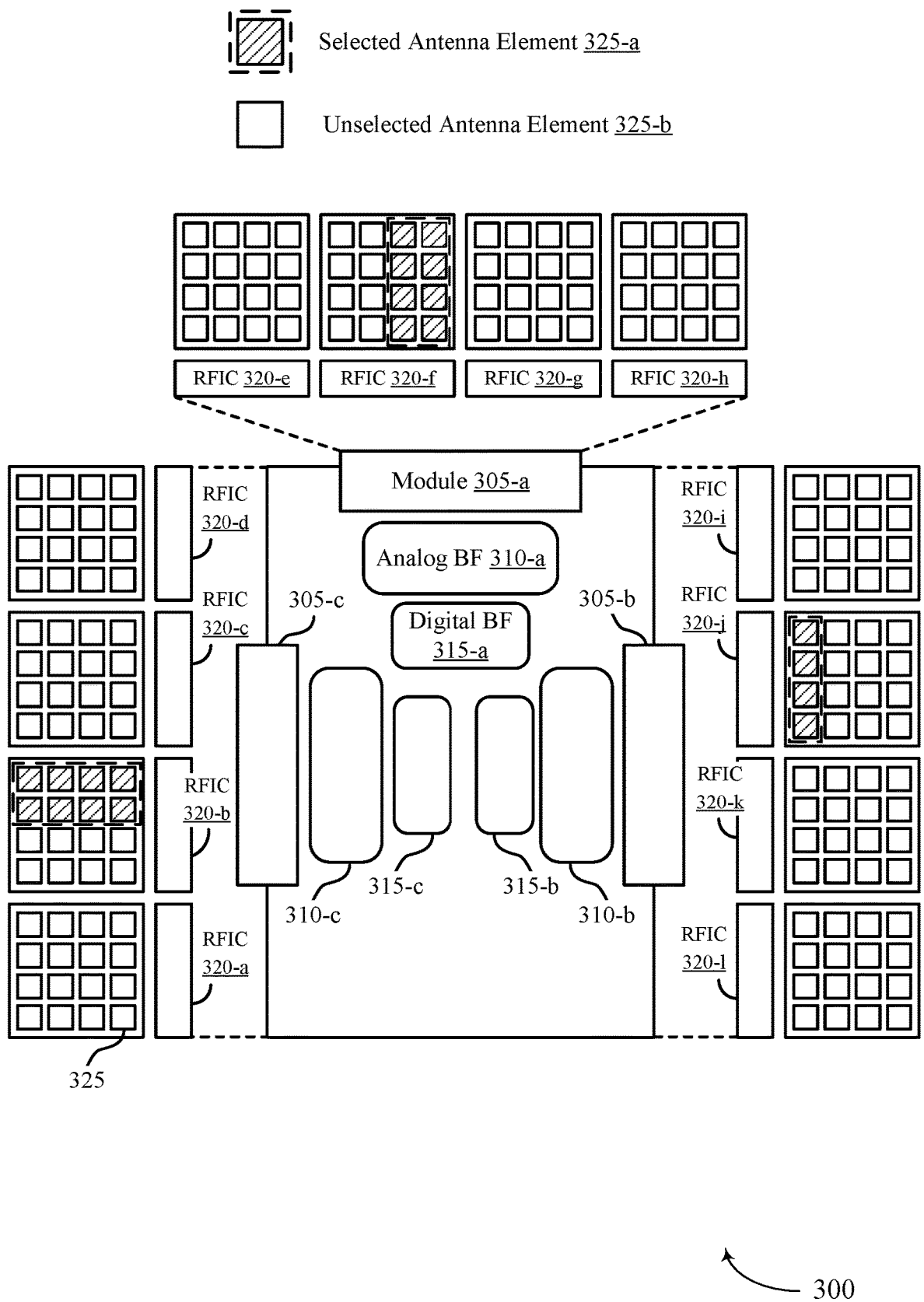
FIG. 3 illustrates an example of a device that supports antenna array reconfiguration at both ends of an mmW link in accordance with aspects of the present disclosure.

FIG. 3 illustrates an example of a device 300 that supports antenna array reconfiguration at both ends of an mmW link in accordance with aspects of the present disclosure. In some examples, the device 300 may implement aspects of wireless communications systems 100 and 200. The device 300 may be an example of a base station 105, such as a base station 105-*a* or a base station 105-*b*, or a UE 115, such as a UE 115-*a* or a UE 115-*b*, as described with reference to FIG. 2. The device 300 may communicate with another device over a communication link, such as a sidelink, a backhaul link, or an access link.

Device 300 may include one or more antenna modules 305 (e.g., antenna modules 305-*a*, 305-*b*, and 305-*c*), which may each be configured with an analog beamformer 310 and a digital beamformer 315. For example, antenna module 305-*a* may include analog beamformer 310-*a* and digital beamformer 315-*a*; antenna module 305-*b* may include analog beamformer 310-*b* and digital beamformer 315-*b*; and antenna module 305-*c* may include analog beamformer 310-*c* and digital beamformer 315-*c*. The one or more antenna modules 305 may be controlled by a number of radio frequency integrated circuits (RFICs) 320, and each RFIC 320 may operate a number of antenna elements 325.

An analog beamformer 310 and a digital beamformer 315 may perform operations for an antenna module 305 (e.g., beamforming operations) such that the antenna module 305 may be configured to transmit or receive signals according to the operations of the analog beamformer 310 and the digital beamformer 315. For example, the analog beamformer 310 and the digital beamformer 315 may effectively operate a transmit and/or a receive beam for communications using an antenna module 305 as described with reference to FIG. 1. In some cases, the device 300 may determine to operate a number of selected antenna elements 325-*a*, and the analog beamformer 310 and the digital beamformer 315 may configure the antenna module 305 with an antenna element configuration to enable the device 300 to transmit and/or receive using the number of selected antenna elements 325-*a*.

As described, each antenna module 305 may include a set of antenna elements 325, and a number of RFICs 320 may operate the set of antenna elements 325. In some cases, the set of antenna elements 325 of each antenna module 305 may be based on the frequency range in which the antenna module 305 is capable of communicating. For example, higher frequency transmissions with shorter wavelengths may support closer antenna element 325 spacing than lower frequency transmissions with longer wavelengths. Thus, if higher frequency bands are implemented for wireless communications, a device 300 may implement a greater number of antenna elements 325 with narrower spacing in between the antenna elements 325 enabled by beamforming at the higher frequencies. In some cases, antenna modules 305 may remain similar in size, enabling the a device 300 to pack a greater number of antenna elements 325 on an antenna module 305 than would be supported by the antenna module 305 for lower frequency communications.

In some examples, the space that an antenna element 325 occupies (e.g., including the gaps between the antenna elements 325) may be based on (e.g., may be proportional to) the wavelength of a transmission. For instance, the wavelength of a transmission at 120 GHz may be four (4) times smaller than the wavelength of a transmission at 30 GHz. Likewise, for the same antenna module 305 aperture size, 4 times as many antenna elements 325 may fit in each dimension of the antenna module 305 for transmitting at 120 GHz as compared to transmitting at 30 GHz. As such, a 4×1 antenna array for a transmissions at 30 GHz may take up the same space as a 16×4 antenna array for transmissions at 120 GHz. In some examples described herein, the antenna modules 305 may be configured with a number of antenna elements 325 that may enable simultaneous or alternative operations at multiple frequencies (e.g., carriers) with a flexible antenna array (e.g., a collocated antenna array) using multiple antenna feeds for different frequency ranges (e.g., frequency bands).

Antenna arrays may be relatively low cost to physically configure on an antenna module 305, but to operate an antenna array (e.g., a number of antenna elements 325) an RFIC 320 may consume power. In some cases, and especially when a large number of antenna elements 325 are configured on an antenna module 305, it may be expensive (e.g., may cost a significant amount of power) to power the RFICs 320 in order to operate the large number of antenna elements 325. An RFIC 320 may be a mixer, an up/down converter, a power amplifier, a low noise amplifier, a phase shifter, an automatic gain control, or any combination of these or other similar components of a device 300 that may support the operations of an antenna module 305 or one or more antenna elements 325.

As illustrated in FIG. 3, three (3) antenna modules 305 may each include 4 RFICs 320, which may each operate sixteen (16) antenna elements 325 (e.g., each RFIC 320 may operate a 4×4 antenna array). As such, sixty-four (64) antenna elements 325 may be included on an antenna module 305. However, the numbers of antenna modules 305, RFICs 320, and antenna elements 325 shown in FIG. 3 are an illustrative example and are not meant to limit the present disclosure to the illustrated configuration. As such, the techniques described herein may apply to a device 300 with any number of antenna modules 305 that may include any number of RFICs 320 and antenna elements 325, and an RFIC 320 may operate any number of antenna elements 325 (e.g., an RFIC 320 may operate 4 antenna elements, 16 antenna elements, or any other number of antenna elements based on a capability of the RFIC 320). Further, as the number of antenna elements 325 of an antenna module 305 increases, the number of RFICs 320 used to operate the antenna elements 325 may increase accordingly.

In some cases, a device 300 may operate a number of antenna elements 325 by powering (e.g., turning on) one or more RFICs 320. Upon powering on one or more RFICs 320, the device 300 may operate the number of antenna elements 325 that may be controlled by the one or more RFICs 320. In some examples, it may be impractical for the device 300 to power on all of the RFICs 320 (e.g., based on a number of conditions at the device 300). For example, powering on all of the RFICs 320 with which the device 300 is configured may result in a significant power overhead.

Additionally, the device 300 may power on a subset of the RFICs 320 to improve its beamforming capability. For example, by powering on a subset of the total number of RFICs 320, and therefore by using a subset of the total number of antenna elements 325 of an antenna module 305 (e.g., using selected antenna elements 325-*a*), the device 300 may generate a wider beam (e.g., allowing the device 300 to transmit a message to all of a wider angular spread of points in a cluster of partner devices). Additionally or alternatively, by determining which RFICs 320 to power on, the device 300 may have more freedom to arrange, place, and select its antenna array configuration. Thus, in addition to saving on power usage, using a subset of the antenna elements 325 may also enable the device 300 to transmit and/or receive with enhanced beamforming due to the more degrees of freedom available to the device 300 in its antenna element configuration.

Additionally, the device 300 may determine to operate a number of selected antenna elements 325-*a* based on a condition identified at the device 300. For example, the device 300 may determine to operate a number of selected antenna elements 325-*a* based on a power availability, a thermal constraint, an interference constraint, a power amplifier rating, a PDE constraint, an mmW component rating, a beamwidth constraint, or an angular spread estimate. The conditions may apply to either the device 300 or a partner device (e.g., another device 300 in communication with the device 300), and the device 300 and/or the partner device may identify that any number of the conditions may apply in combination.

In some examples, the device 300 may determine that the device 300 has a limited power availability. The device 300 may select to operate a number of RFICs 320 and may power down—or otherwise not operate—the remaining RFICs 320, effectively conserving power at the device 300. For example, as illustrated in FIG. 3, the device may operate RFICs 320-*b*, 320-*f* and 320-*j* corresponding to selected antenna elements 325-*a*, and may conserve power by refraining from operating RFICs 320-*a*, 320-*c*, 320-*d*, 320-*e*, 320-*g*, 320-*h*, 320-*i*, 320-*k*, and 320-*l*. In some cases, the device 300 may select antenna elements 325 for communication across multiple RFICs 320 for a particular antenna module 305 and may concurrently operate multiple RFICs 320 for the antenna module 305. Alternatively, the device 300 may select not to operate any antenna elements 325 for a particular antenna module 305 and may refrain from powering up any of the corresponding RFICs 320 for the antenna module 305.

Accordingly, the device 300 may generate a beam (e.g., by using the analog beamformer 310 and the digital beamformer 315) based on using the number of RFICs 320 the device 300 is powering. Similarly, the device 300 may perform the operations and functions associated with selecting or modifying an antenna element configuration (e.g., increasing or decreasing the number of selected antenna elements 325-*a*) of an antenna module 305 based on any other condition identified by the device 300. The device 300 may determine to select any number and configuration of antenna elements 325 or determine to configure any sort of antenna array (e.g., the device 300 may use a 1×4, a 2×4, or any other size array of selected antenna elements 325-*a*) based on the number of conditions that may influence the antenna element configuration of the device 300. The device 300 may reduce a communication power overhead by not operating a number of unselected antenna elements 325-*b*.

As described in FIG. 2, in some cases, the device 300 may determine to operate a number of selected antenna elements 325-*a* such that the device 300 may reduce its antenna array size (e.g., its antenna array gain), which may adversely affect the link margin between the device 300 and a partner device. In such cases, the device 300 may transmit a message, such as array indication message 220 as described with reference to FIG. 2, to the partner device to indicate the number of selected antenna elements 325-*a* that the device 300 is operating.

Based on receiving the message, the partner device may determine to modify its antenna array configuration. In some examples, the partner device may initially operate a number of selected antenna elements 325-*a* and may determine to modify the operating number of selected antenna elements 325-*a* to maintain the link margin between the device 300 and the partner device (e.g., based on the number of selected antenna elements 325-*a* for the device 300). In a similar manner, the device 300 may receive the message indicating that a partner device selected a subset of antenna elements. In such examples, the device 300 may determine to operate a number of selected antenna elements 325-*a* based on receiving the message such that the link margin between the partner device and the device 300 is maintained (or such that a change in the link margin is reduced or mitigated). For example, the device 300 may determine to operate a number of selected antenna elements 325-*a* based on receiving the message such that the link margin changes by less than a threshold amount.

Figure 4:
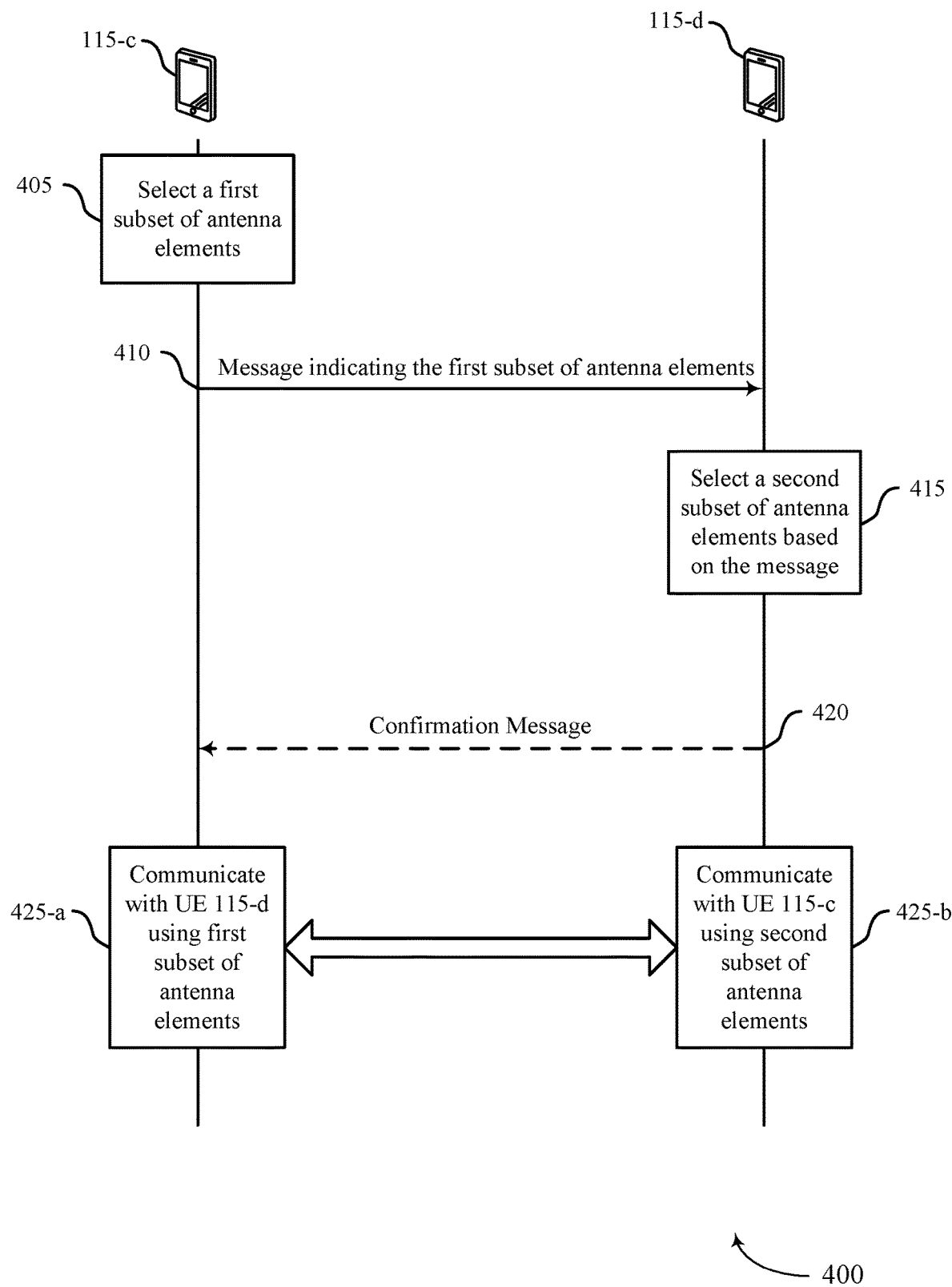
FIG. 4 illustrates an example of a process flow that supports antenna array reconfiguration at both ends of an mmW link in accordance with aspects of the present disclosure.

FIG. 4 illustrates an example of a process flow 400 that supports antenna array reconfiguration at both ends of an mmW link in accordance with aspects of the present disclosure. In some examples, the process flow 400 may implement aspects of wireless communications systems 100 and 200. The process flow 400 may include UE 115-*c* and UE 115-*d*, which may be examples of the corresponding devices described with reference to FIGS. 1 through 3. UE 115-*c* and UE 115-*d* may implement one or more techniques for implementing antenna array reconfiguration with array indication messaging. Alternative examples of the following may be implemented, where some steps are performed in a different order than described or are not performed at all. In some cases, steps may include additional features not mentioned below, or further steps may be added.

At 405, UE 115-*c* may select a first subset of antenna elements. For example, UE 115-*c* may select a subset of selected antenna elements 325-*a* of an antenna module 305, as described with reference to FIG. 3. In some cases, the UE 115-*c* may select the subset of antenna elements based on a link budget threshold. The link budget threshold may be a threshold based on maintaining a previous link budget (e.g., a link budget between the UE 115-*c* and the UE 115-*d* prior to the UE 115-*c* selecting the first subset of antenna elements), a link margin, a threshold radiated power (e.g., an EIRP), or a threshold received power (e.g., under which the transmission may not be successfully received). In some other cases, the UE 115-*c* may select a subset of antenna elements based on identifying a trigger condition applicable to the UE 115-*c* and/or the UE 115-*d*.

At 410, the UE 115-*c* may transmit a message to the UE 115-*d* indicating the first subset of antenna elements that the UE 115-*c* selected. The message may be sent over the communication link between the UE 115-*c* and the UE 115-*d* and may be an array indication message 220 as described with reference to FIG. 2. In some examples, the message may be a request message that may request the UE 115-*d* to modify its antenna element configuration (e.g., select a second subset of antenna elements). In other examples, the message may be an indication message that may indicate to the UE 115-*d* the antenna element configuration for the UE 115-*d* to use. In yet other examples, the message may be a capability message for the UE 115-*c*. The capability message may indicate that the UE 115-*c* is capable of communicating using a number of antenna elements corresponding to the selected first subset of antenna elements. In this way, the UE 115-*c* may dynamically change an antenna element capability indication based on the set (e.g., subset) of antenna elements selected by the UE 115-*c* for communications.

In some cases, the message sent by the UE 115-*c* at 410 may be sent once at the beginning of establishing communications between the UE 115-*c* and the UE 115-*d* (e.g., the message may be transmitted statically). In other cases, the message may be transmitted periodically or aperiodically from the UE 115-*c* to the UE 115-*d* based on changing conditions at the UE 115-*c* and/or the UE 115-*d* (e.g., the message may be transmitted dynamically).

At 415, the UE 115-*d* may determine to select a second subset of antenna elements based on the message. In the examples that the message sent at 410 is a request message, at 415 the UE 115-*d* may determine to modify its antenna array configuration based on receiving the message and identifying if one or more conditions (e.g., a power availability, etc.) at the UE 115-*d* constrains its antenna element selection. Alternatively, in some examples where the message sent at 410 is an indication message, the UE 115-*d* may automatically select the second subset of antenna elements (e.g., the UE 115-*d* may not have an option to reject selecting the second subset of antenna elements).

In some cases, at 420, the UE 115-*d* may transmit a confirmation message to the UE 115-*c* based on selecting the second subset of antenna elements. In some cases, the UE 115-*d* may transmit the confirmation message when the message sent at 410 is a request message.

At 425, the UE 115-*c* and the UE 115-*d* may communicate over the communication link between the UE 115-*c* and the UE 115-*d* using their respective selected subsets of antenna elements. In some cases, the communication between the UE 115-*c* and the UE 115-*d* may efficiently use available resources and/or may efficiently generate directional beams at each end of the communication link (e.g., at both the UE 115-*c* and the UE 115-*d*) based on the collaboration process for selecting antenna elements (e.g., based on the messaging at 410). The techniques described herein may enable two communicating devices to more efficiently communicate by dynamically configuring their antenna element configurations through mutual collaboration based on conditions that apply to one or both of the two communicating devices and the communication link between the two devices.

Figure 5:
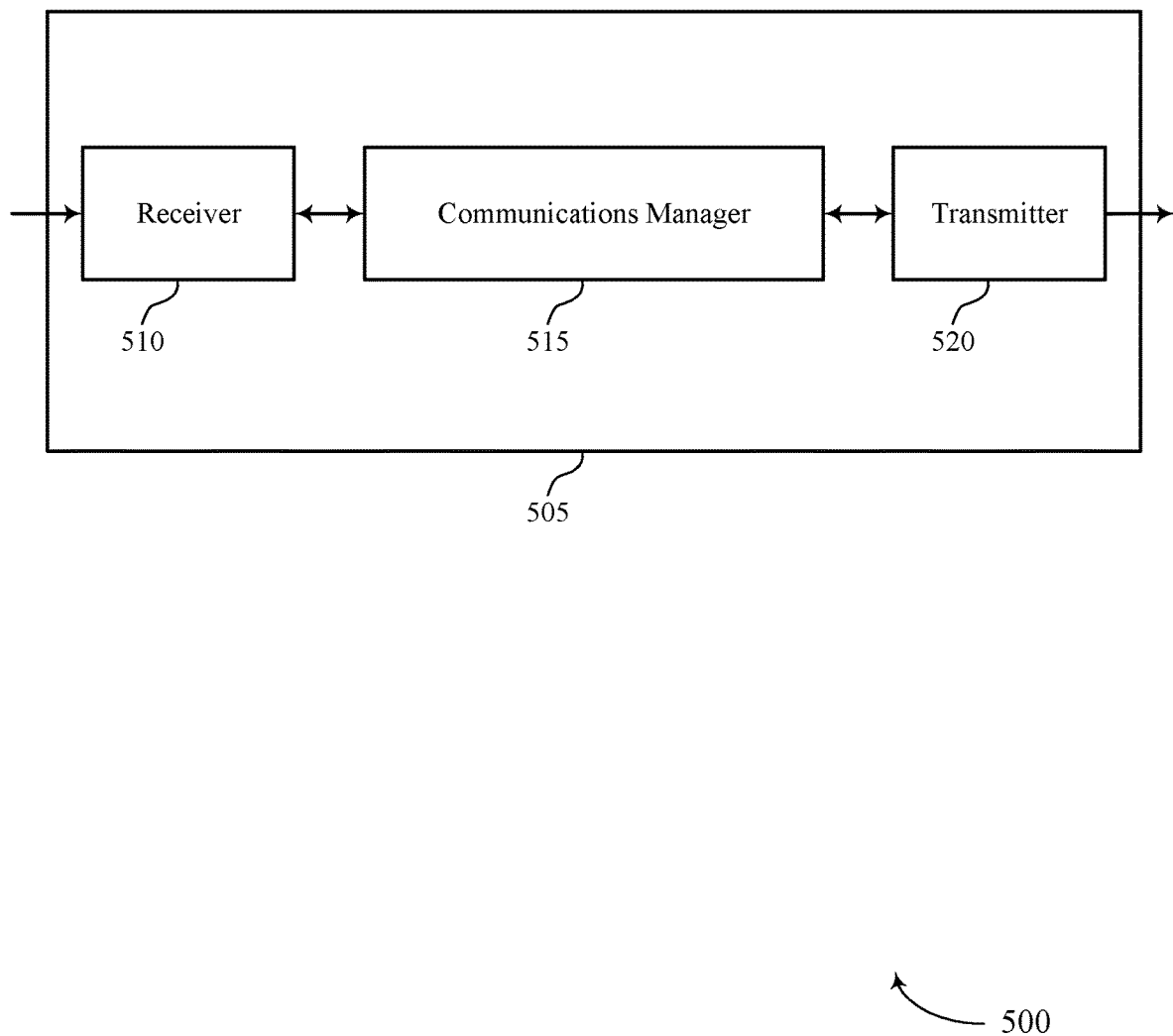
FIGS. 5 and 6 show block diagrams of devices that support antenna array reconfiguration at both ends of an mmW link in accordance with aspects of the present disclosure.

FIG. 5 shows a block diagram 500 of a device 505 that supports antenna array reconfiguration at both ends of an mmW link in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to antenna array reconfiguration at both ends of an mmW link, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas (e.g., a set of antenna elements).

The communications manager 515 may be implemented at a first device. The communications manager 515 may select, from a set of antenna elements of an antenna module, a subset of antenna elements of the set of antenna elements for a communication link with a second device, transmit, to the second device, a message indicating the selected subset of antenna elements, and communicate with the second device over the communication link using the selected subset of antenna elements and based on the message.

Additionally or alternatively, the communications manager 515 may receive, from a second device, a message indicating a first subset of antenna elements selected for a communication link by the second device, select, from a set of antenna elements of an antenna module, a second subset of antenna elements of the set of antenna elements for the communication link with the second device based on the message, and communicate with the second device over the communication link using the selected second subset of antenna elements.

The actions performed by the communications manager 515 as described herein may be implemented to realize one or more potential advantages. One implementation may allow the device to transmit an indication of an antenna element reconfiguration at the device to another device based on one or more conditions that may apply at either— or both—ends of the communication link between the devices. This implementation may be used to enable communicating devices to collaborate on their operating antenna element configurations, which may result in more efficient communication based on operating a number of antenna elements according to conditions at both ends of the communication link. Additionally, this may allow the communicating devices to more efficiently use the available resources at each end of the communication link, allowing both devices to save power and increase battery life. For example, a first device may reduce a number of operating antenna elements to conserve power and battery based on an amount of remaining available power at the first device. The first device may transmit the message indicating the selected subset of antenna elements, and a second device receiving the message indicating the selected subset of antenna elements may correspondingly adjust its antenna array configuration to maintain reliable communications over the communication link.

Based on a device configuring its antenna element configuration according to a condition at the device, the device may use a reduced number of antenna elements when a limiting condition applies. Accordingly, the processor of the device may perform a reduced number of computations and lower computational complexities by performing the processing operations for a reduced number of antenna elements, RFICs, or both. By performing the processing operations for a reduced number of antenna elements, RFICs, or both, the processor may save processing time and use less power, enabling larger power allocations for other components of the device. Additionally or alternatively, if a first device receives a message indicating a first subset of antenna elements selected for a communication link by a second device and selects a second subset of antenna elements based on the message, the devices may maintain a link margin and mitigate communication failures due to the power savings at one end of the communication link. This antenna array reconfiguration at both ends of the link may support reliable transmissions, reducing the number of retransmissions over the channel and correspondingly reducing processing overhead (e.g., for handling retransmissions) and signaling overhead.

The communications manager 515 may be an example of aspects of the communications manager 810 or 910 as described herein. The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas (e.g., a set of antenna elements).

Figure 6:
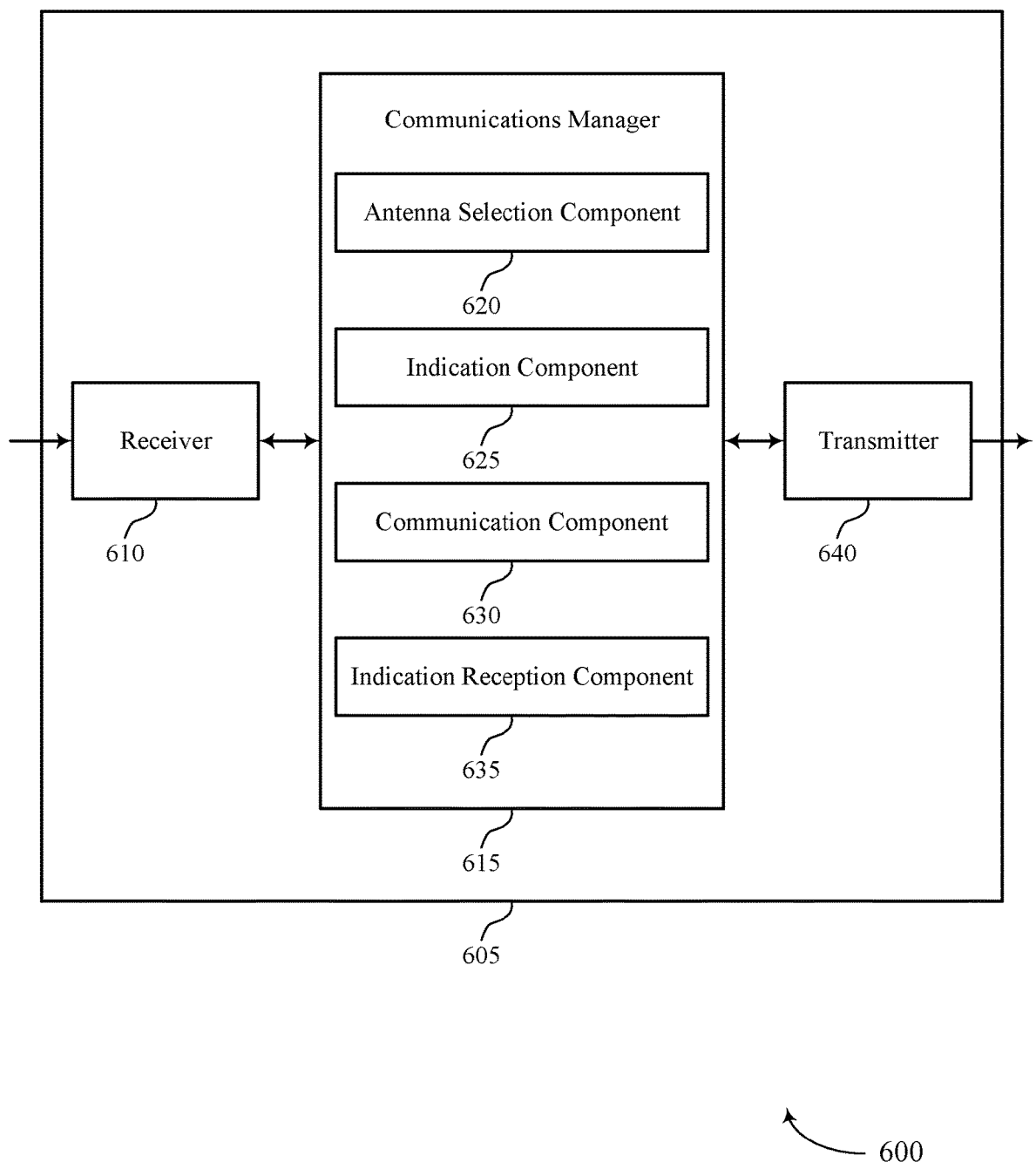

FIG. 6 shows a block diagram 600 of a device 605 that supports antenna array reconfiguration at both ends of an mmW link in accordance with aspects of the present disclosure. The device 605 may be an example of aspects of a device 505, a UE 115, or a base station 105 as described herein. The device 605 may include a receiver 610, a communications manager 615, and a transmitter 640. The device 605 may also include a processor. Each of these components may be in communication with one another (e.g., via one or more buses).

Receiver 610 may receive information such as packets, user data, or control information associated with various information channels (e.g., control channels, data channels, and information related to antenna array reconfiguration at both ends of an mmW link, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include an antenna selection component 620, an indication component 625, a communication component 630, and an indication reception component 635. The communications manager 615 may be an example of aspects of the communications manager 810 or 910 as described herein. In some cases, one or more of these components may be connected to or components of the receiver 610, the transmitter 640, or a transceiver. For example, the indication component 625 may be a component of a transmitter 640 or a transceiver, the indication reception component 635 may be a component of a receiver 610 or a transceiver, and the communication component 630 may be a component of a receiver 610, a transmitter 640, or a transceiver. The communications manager 615 may be implemented at a first device (e.g., the device 605).

In some cases, the antenna selection component 620 may select, from a set of antenna elements of an antenna module, a subset of antenna elements of the set of antenna elements for a communication link with a second device. The indication component 625 may transmit, to the second device, a message indicating the selected subset of antenna elements. The communication component 630 may communicate with the second device over the communication link using the selected subset of antenna elements and based on the message.

Additionally or alternatively, the indication reception component 635 may receive, from a second device, a message indicating a first subset of antenna elements selected for a communication link by the second device. The antenna selection component 620 may select, from a set of antenna elements of an antenna module, a second subset of antenna elements of the set of antenna elements for the communication link with the second device based on the message. The communication component 630 may communicate with the second device over the communication link using the selected second subset of antenna elements.

Transmitter 640 may transmit signals generated by other components of the device 605. In some examples, the transmitter 640 may be collocated with a receiver 610 in a transceiver module. For example, the transmitter 640 may be an example of aspects of the transceiver 820 or 920 as described with reference to FIGS. 8 and 9. The transmitter 640 may utilize a single antenna or a set of antennas.

Figure 7:
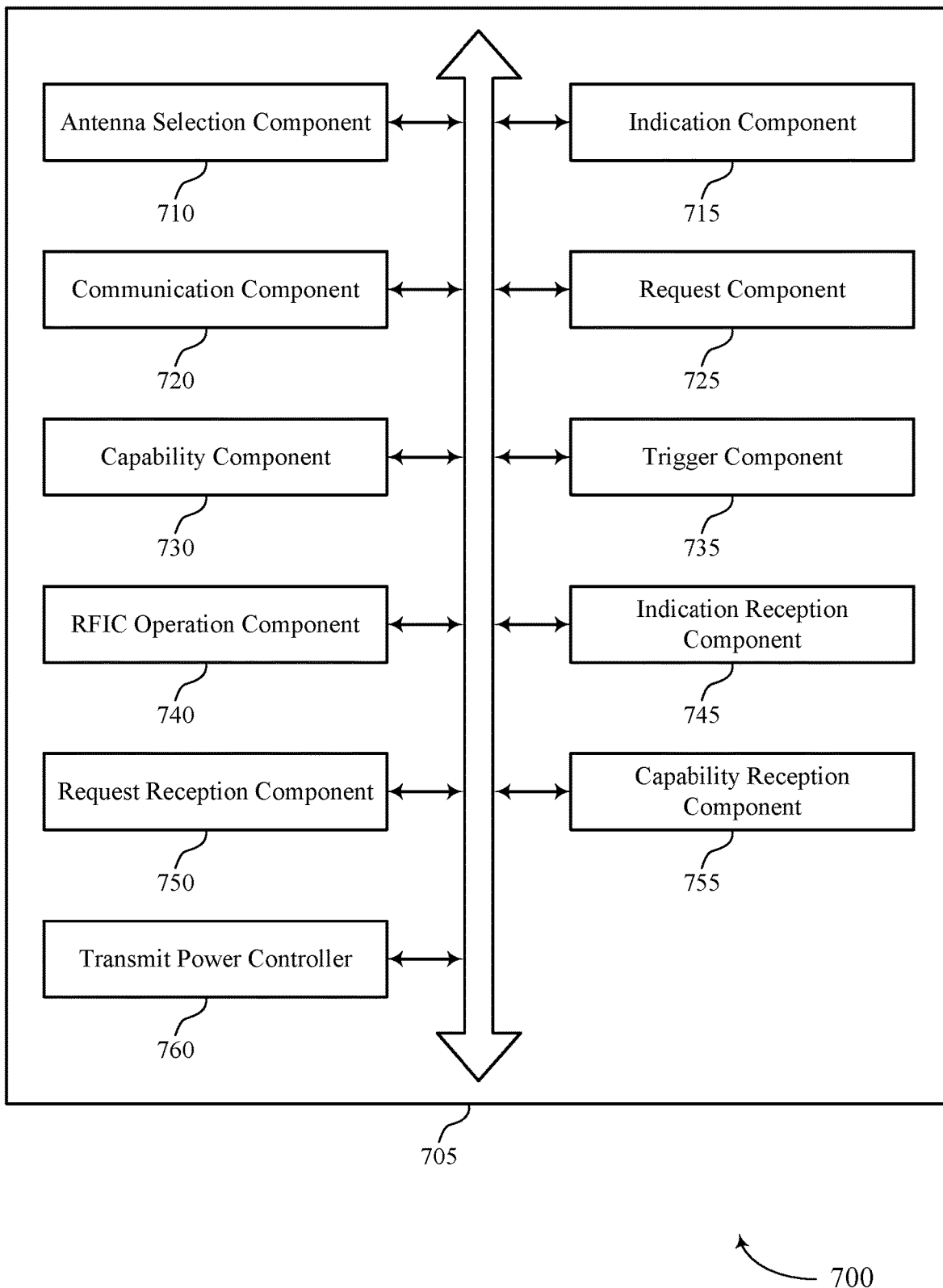
FIG. 7 shows a block diagram of a communications manager that supports antenna array reconfiguration at both ends of an mmW link in accordance with aspects of the present disclosure.

FIG. 7 shows a block diagram 700 of a communications manager 705 that supports antenna array reconfiguration at both ends of an mmW link in accordance with aspects of the present disclosure. The communications manager 705 may be an example of aspects of a communications manager 515, a communications manager 615, a communications manager 810, or a communications manager 910 as described herein. The communications manager 705 may include an antenna selection component 710, an indication component 715, a communication component 720, a request component 725, a capability component 730, a trigger component 735, an RFIC operation component 740, an indication reception component 745, a request reception component 750, a capability reception component 755, a transmit power controller 760, or any combination of these or other components for antenna array reconfiguration and communication. Each of these modules may communicate, directly or indirectly, with one another (e.g., via one or more buses). The communications manager 705 may be implemented at a first device, such as a base station 105 or a UE 115.

In some implementations, the antenna selection component 710 may select, from a set of antenna elements of an antenna module, a subset of antenna elements of the set of antenna elements for a communication link with a second device. In some examples, selecting the subset of antenna elements may involve the antenna selection component 710 selecting the subset of antenna elements based on a link budget threshold for the communication link. In some cases, the first device and the second device are UEs 115 and the communication link is a sidelink or a relay communication link. In some other cases, the first device and the second device are base stations 105 and the communication link is a backhaul link or a relay communication link.

The indication component 715 may transmit, to the second device, a message indicating the selected subset of antenna elements. The communication component 720 may communicate with the second device over the communication link using the selected subset of antenna elements and based on the message. In some examples, communicating with the second device over the communication link involves the communication component 720 receiving, from the second device, one or more messages over the communication link using the selected subset of antenna elements. In some cases, a carrier frequency for the communication link is greater than 52.6 GHz.

In some cases, transmitting the message may involve the request component 725 transmitting a request message for the second device to modify an antenna element configuration at the second device based on the selected subset of antenna elements at the first device. In some examples, the request component 725 may receive, from the second device in response to the request message, a confirmation message indicating that the second device modified the antenna element configuration at the second device based on the selected subset of antenna elements at the first device. In some cases, communicating with the second device over the communication link using the selected subset of antenna elements is based on receiving the confirmation message. In some cases, the request message indicates a requested number of antenna elements for the second device to use for the communication link.

In some other cases, transmitting the message may involve the capability component 730 transmitting a capability message for the first device, where the capability message indicates that the first device is capable of operating the selected subset of antenna elements. In some examples, the capability component 730 may dynamically select an antenna element capability of the first device for the capability message based on the selecting.

The trigger component 735 may determine to select the subset of antenna elements based on a power availability at the first device, a power availability at the second device, a thermal constraint at the first device, a thermal constraint at the second device, an interference constraint at the first device, an interference constraint at the second device, a power amplifier rating at the first device, a power amplifier rating at the second device, an exposure constraint (e.g., a maximum permissible exposure constraint, such as a PDE constraint) at the first device, an exposure constraint (e.g., a maximum permissible exposure constraint, such as a PDE constraint) at the second device, an mmW component rating at the first device, an mmW component rating at the second device, a beamwidth constraint of a beam used with the subset of antenna elements at the first device, a beamwidth constraint of a beam used with a second subset of antenna elements at the second device, an angular spread estimate of one or more dominant clusters at the first device, an angular spread estimate of one or more dominant clusters at the second device, or a combination thereof.

In some examples, the set of antenna elements is controlled by a set of RFICs for the antenna module. In some such examples, selecting the subset of antenna elements involves the RFIC operation component 740 operating a subset of RFICs of the set of RFICs to control the selected subset of antenna elements.

In some other implementations, the indication reception component 745 may receive, from a second device, a message indicating a first subset of antenna elements selected for a communication link by the second device. The antenna selection component 710 may select, from a set of antenna elements of an antenna module, a second subset of antenna elements of the set of antenna elements for the communication link with the second device based on the message. In some examples, selecting the second subset of antenna elements may involve the antenna selection component 710 selecting the second subset of antenna elements based on a link budget threshold for the communication link and the first subset of antenna elements. In some cases, the first device and the second device are UEs 115 and the communication link is a sidelink or a relay communication link. In some other cases, the first device and the second device are base stations 105 and the communication link is a backhaul link or a relay communication link.

The communication component 720 may communicate with the second device over the communication link using the selected second subset of antenna elements. In some examples, communicating with the second device over the communication link involves the communication component 720 transmitting, to the second device, one or more messages over the communication link using the selected second subset of antenna elements. In some cases, a carrier frequency for the communication link is greater than 52.6 GHz.

In some examples, the communication component 720 may communicate with the second device over the communication link using a first number of antenna elements. The indication reception component 745 may determine that the second device reduced a number of operating antenna elements for the communication link based on the indicated first subset of antenna elements. In some examples, the antenna selection component 710 may select, for the second subset of antenna elements for the communication link, a second number of antenna elements that is greater than the first number of antenna elements based on the second device reducing the number of operating antenna elements for the communication link.

In some other examples, the communication component 720 may communicate with the second device over the communication link using a first number of antenna elements. The indication reception component 745 may determine that the second device increased a number of operating antenna elements for the communication link based on the indicated first subset of antenna elements. In some examples, the antenna selection component 710 may select, for the second subset of antenna elements for the communication link, a second number of antenna elements that is less than the first number of antenna elements based on the second device increasing the number of operating antenna elements for the communication link.

In some cases, receiving the message may involve the request reception component 750 receiving a request message for the first device to modify an antenna element configuration at the first device based on the first subset of antenna elements, where the second subset of antenna elements is selected based on the request message. In some examples, the request reception component 750 may transmit, to the second device in response to the request message, a confirmation message indicating that the first device modified the antenna element configuration at the first device based on selecting the second subset of antenna elements. In some examples, the request message indicates a requested number of antenna elements for the first device to use for the communication link and the selected second subset of antenna elements includes the requested number of antenna elements.

In some other cases, receiving the message may involve the capability reception component 755 receiving a capability message for the second device, where the capability message indicates that the second device is capable of operating the first subset of antenna elements.

The transmit power controller 760 may modify a transmit power for the communication link based on the first subset of antenna elements and the selected second subset of antenna elements. In some examples, the set of antenna elements is controlled by a set of RFICs for the antenna module. In some such examples, selecting the second subset of antenna elements involves the RFIC operation component 740 operating a subset of RFICs of the set of RFICs to control the selected second subset of antenna elements.

Figure 8:
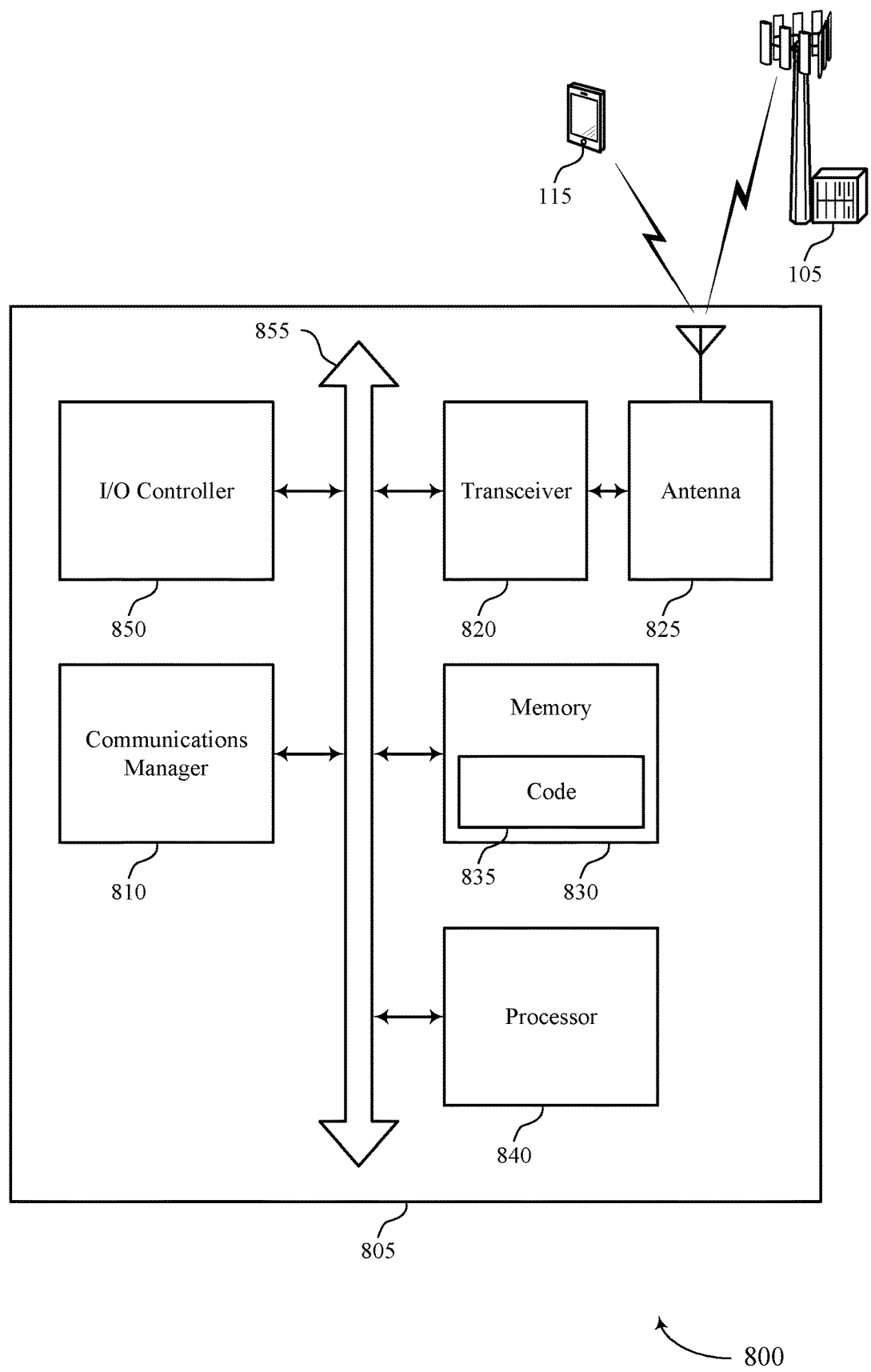
FIGS. 8 and 9 show diagrams of systems including devices that support antenna array reconfiguration at both ends of an mmW link in accordance with aspects of the present disclosure.

FIG. 8 shows a diagram of a system 800 including a device 805 that supports antenna array reconfiguration at both ends of an mmW link in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855). The device 805 may be an example of a first device.

In some implementations, the communications manager 810 may select, from a set of antenna elements of an antenna module, a subset of antenna elements of the set of antenna elements for a communication link with a second device, transmit, to the second device, a message indicating the selected subset of antenna elements, and communicate with the second device over the communication link using the selected subset of antenna elements and based on the message. In some other implementations, the communications manager 810 may receive, from a second device, a message indicating a first subset of antenna elements selected for a communication link by the second device, select, from a set of antenna elements of an antenna module, a second subset of antenna elements of the set of antenna elements for the communication link with the second device based on the message, and communicate with the second device over the communication link using the selected second subset of antenna elements.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting antenna array reconfiguration at both ends of an mmW link).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
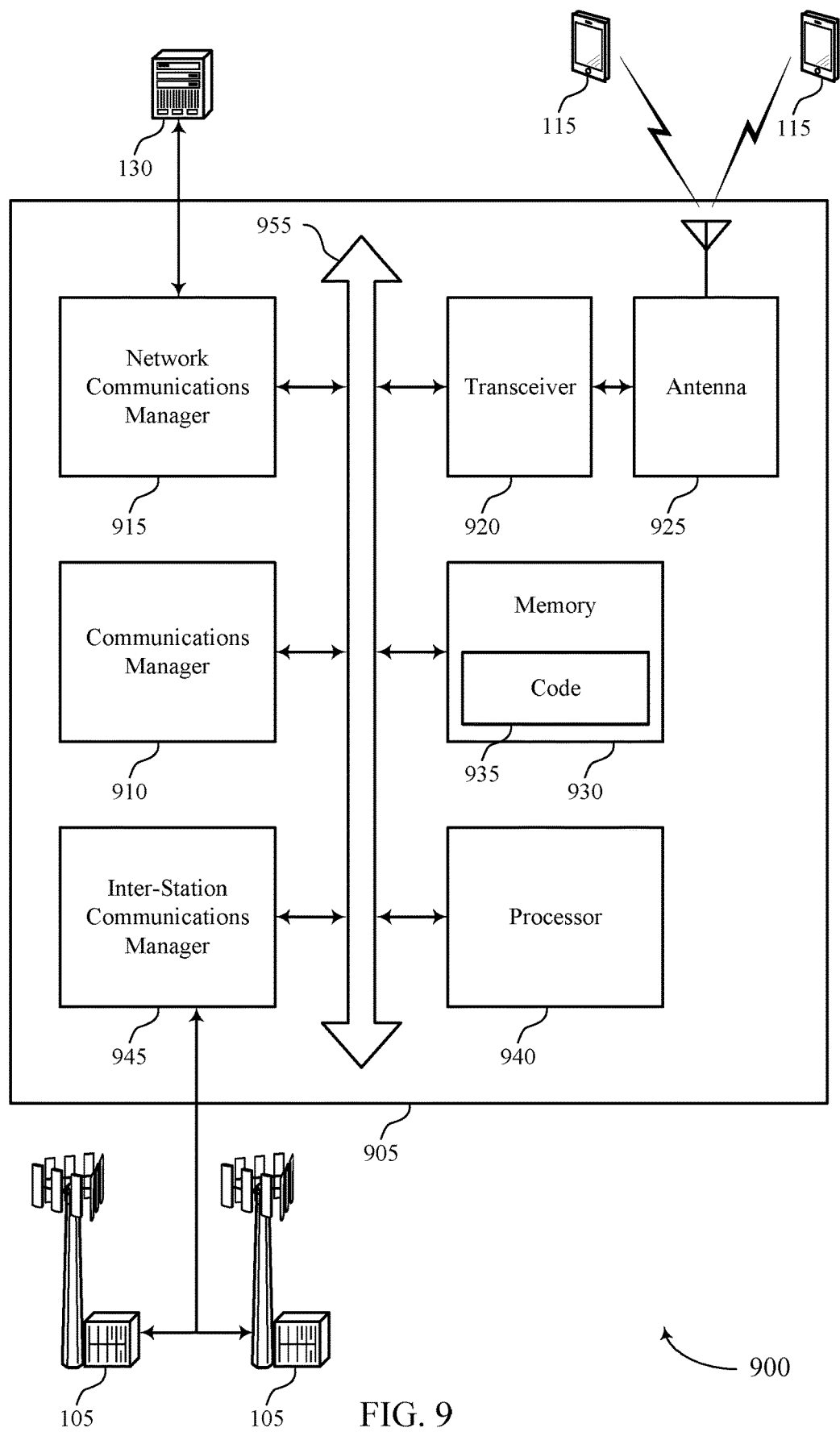

FIG. 9 shows a diagram of a system 900 including a device 905 that supports antenna array reconfiguration at both ends of an mmW link in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955). The device 905 may be an example of a first device.

In some implementations, the communications manager 910 may select, from a set of antenna elements of an antenna module, a subset of antenna elements of the set of antenna elements for a communication link with a second device, transmit, to the second device, a message indicating the selected subset of antenna elements, and communicate with the second device over the communication link using the selected subset of antenna elements and based on the message. In some other implementations, the communications manager 910 may receive, from a second device, a message indicating a first subset of antenna elements selected for a communication link by the second device, select, from a set of antenna elements of an antenna module, a second subset of antenna elements of the set of antenna elements for the communication link with the second device based on the message, and communicate with the second device over the communication link using the selected second subset of antenna elements.

Network communications manager 915 may manage communications with the core network 130 (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting antenna array reconfiguration at both ends of an mmW link).

Inter-station communications manager 945 may manage communications with other base station 105 and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
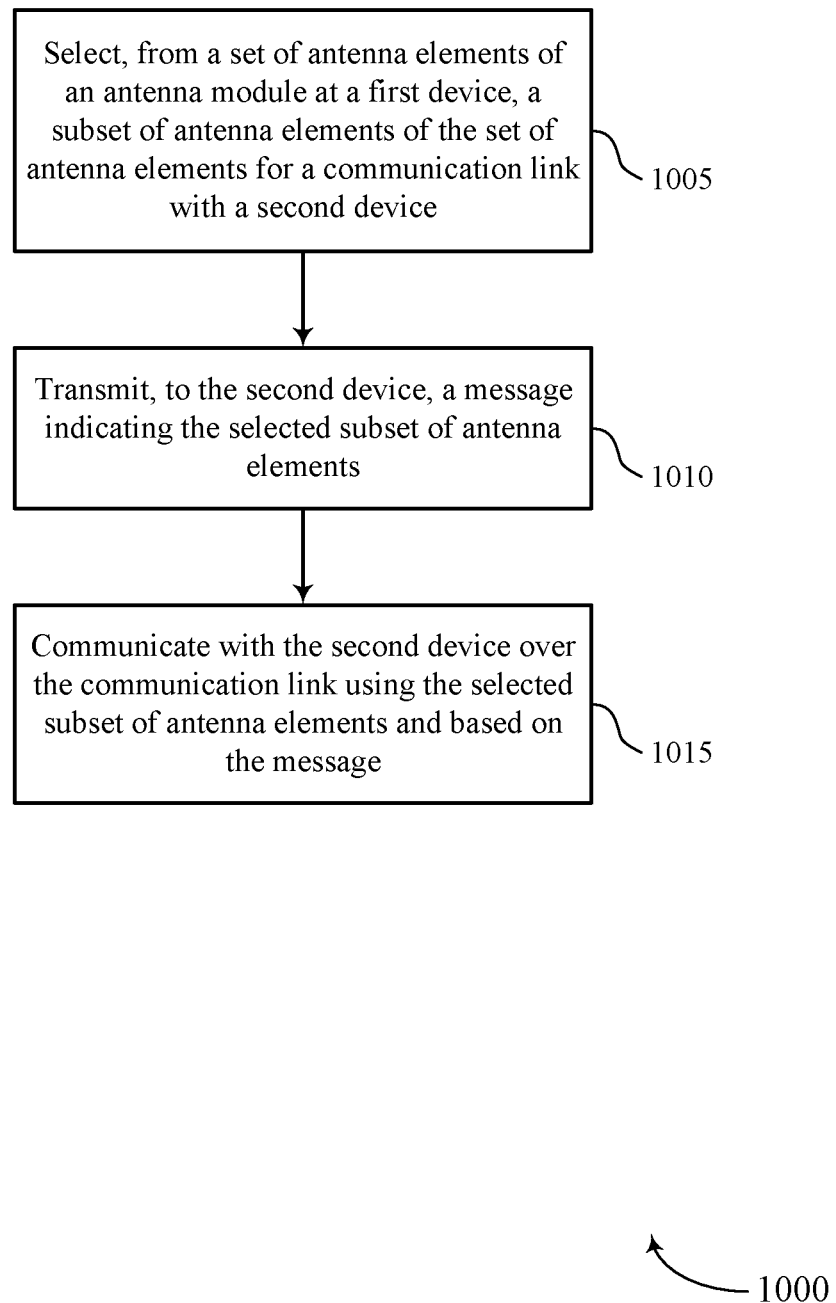
FIGS. 10 through 13 show flowcharts illustrating methods that support antenna array reconfiguration at both ends of an mmW link in accordance with aspects of the present disclosure.

FIG. 10 shows a flowchart illustrating a method 1000 that supports antenna array reconfiguration at both ends of an mmW link in accordance with aspects of the present disclosure. The operations of method 1000 may be implemented by a UE 115, a base station 105, or components of a UE 115 or base station 105 as described herein. For example, the operations of method 1000 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1005, the UE or base station (e.g., a first device) may select, from a set of antenna elements of an antenna module, a subset of antenna elements of the set of antenna elements for a communication link with a second device. The operations of 1005 may be performed according to the methods described herein. In some examples, aspects of the operations of 1005 may be performed by an antenna selection component as described with reference to FIGS. 5 through 9.

At 1010, the UE or base station may transmit, to the second device, a message indicating the selected subset of antenna elements. The operations of 1010 may be performed according to the methods described herein. In some examples, aspects of the operations of 1010 may be performed by an indication component as described with reference to FIGS. 5 through 9.

At 1015, the UE or base station may communicate with the second device over the communication link using the selected subset of antenna elements and based on the message. The operations of 1015 may be performed according to the methods described herein. In some examples, aspects of the operations of 1015 may be performed by a communication component as described with reference to FIGS. 5 through 9.

Figure 11:
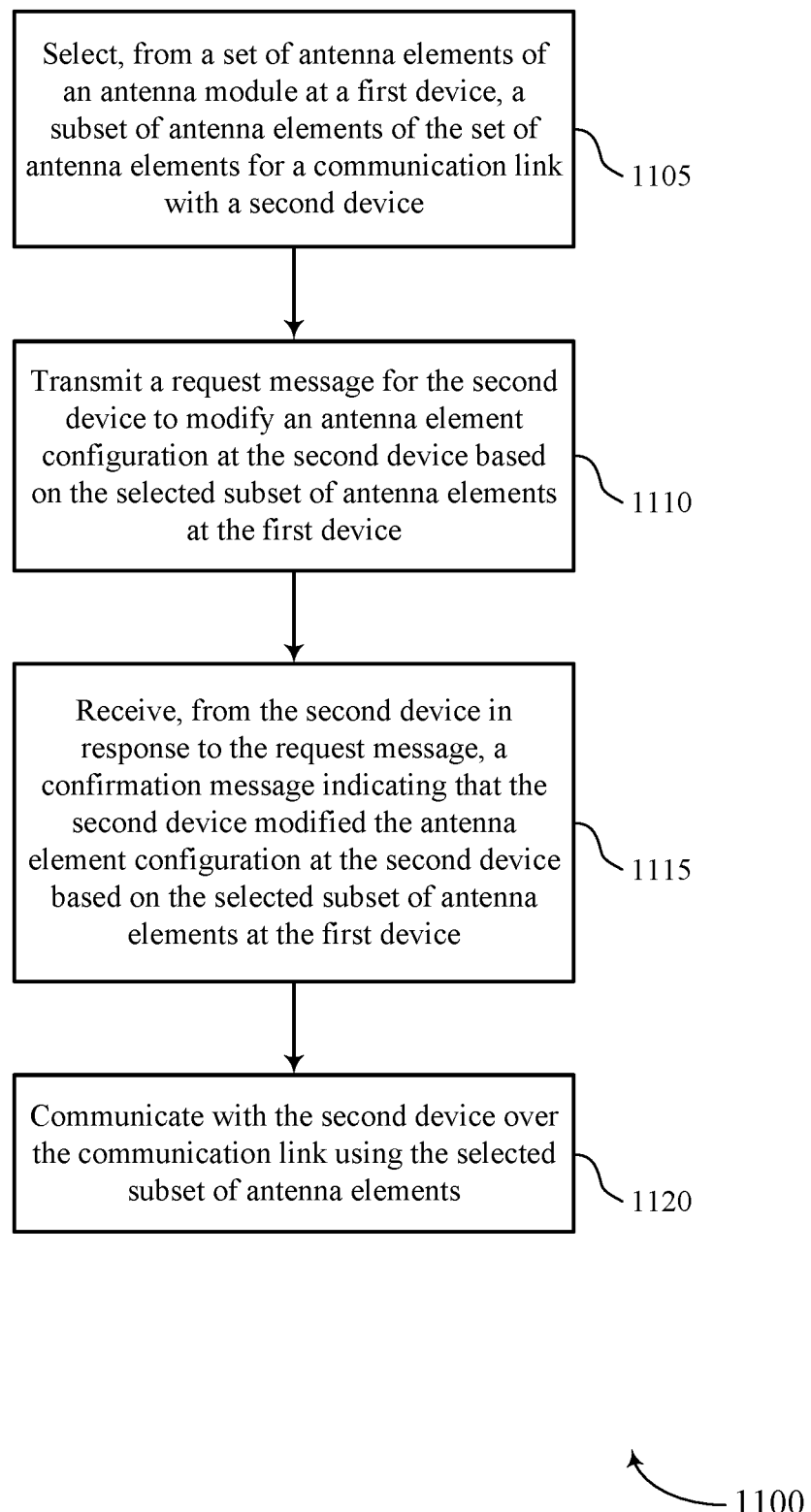

FIG. 11 shows a flowchart illustrating a method 1100 that supports antenna array reconfiguration at both ends of an mmW link in accordance with aspects of the present disclosure. The operations of method 1100 may be implemented by a UE 115, a base station 105, or components of a UE 115 or base station 105 as described herein. For example, the operations of method 1100 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station (e.g., a first device) may select, from a set of antenna elements of an antenna module, a subset of antenna elements of the set of antenna elements for a communication link with a second device. The operations of 1105 may be performed according to the methods described herein. In some examples, aspects of the operations of 1105 may be performed by an antenna selection component as described with reference to FIGS. 5 through 9.

At 1110, the UE or base station may transmit a request message for the second device to modify an antenna element configuration at the second device based on the selected subset of antenna elements at the first device. The operations of 1110 may be performed according to the methods described herein. In some examples, aspects of the operations of 1110 may be performed by a request component as described with reference to FIGS. 5 through 9.

At 1115, the UE or base station may receive, from the second device in response to the request message, a confirmation message indicating that the second device modified the antenna element configuration at the second device based on the selected subset of antenna elements at the first device. The operations of 1115 may be performed according to the methods described herein. In some examples, aspects of the operations of 1115 may be performed by a request component as described with reference to FIGS. 5 through 9.

At 1120, the UE or base station may communicate with the second device over the communication link using the selected subset of antenna elements and based on the request message. The operations of 1120 may be performed according to the methods described herein. In some examples, aspects of the operations of 1120 may be performed by a communication component as described with reference to FIGS. 5 through 9.

Figure 12:
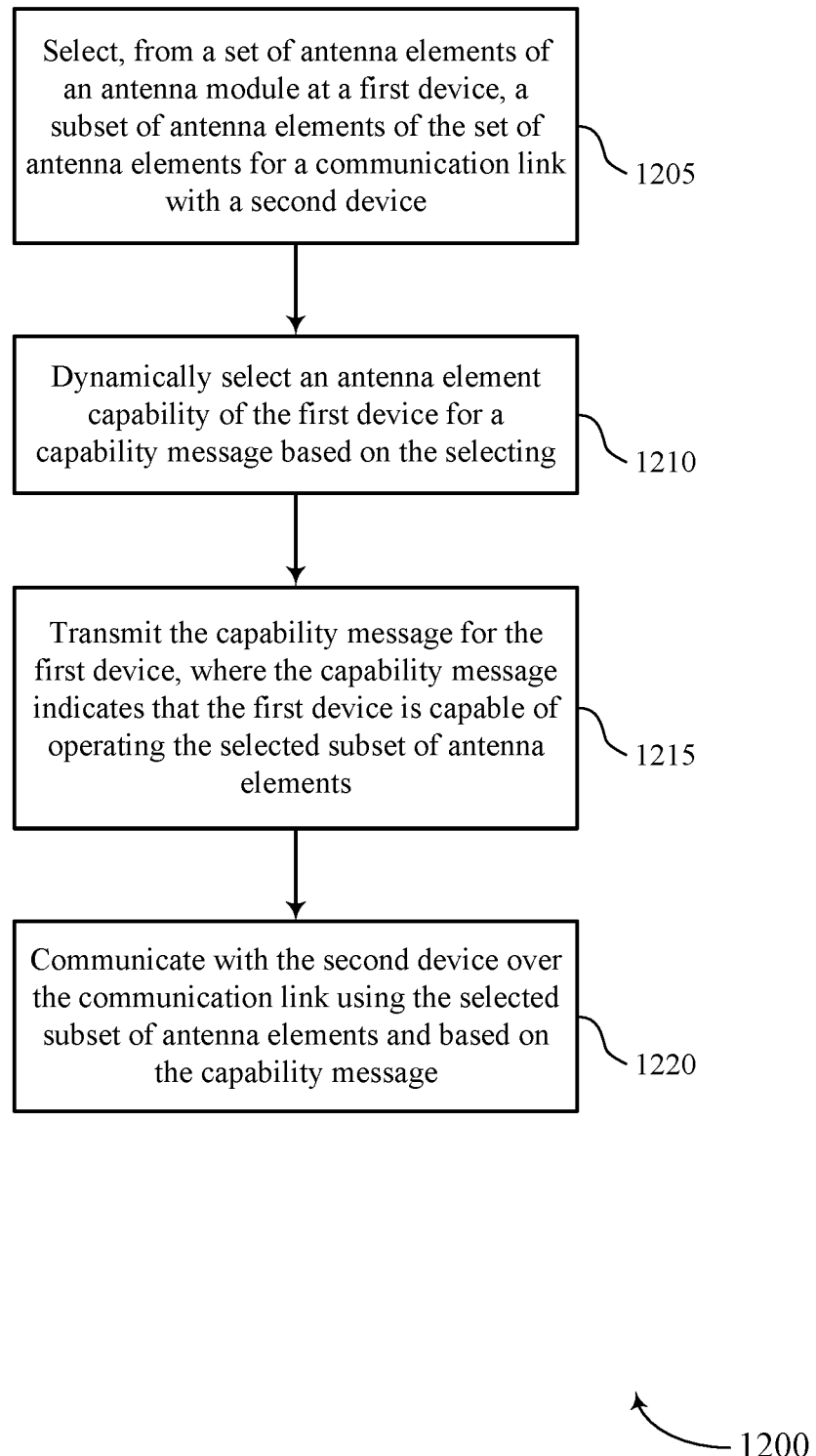

FIG. 12 shows a flowchart illustrating a method 1200 that supports antenna array reconfiguration at both ends of an mmW link in accordance with aspects of the present disclosure. The operations of method 1200 may be implemented by a UE 115, a base station 105, or components of a UE 115 or base station 105 as described herein. For example, the operations of method 1200 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station (e.g., a first device) may select, from a set of antenna elements of an antenna module, a subset of antenna elements of the set of antenna elements for a communication link with a second device. The operations of 1205 may be performed according to the methods described herein. In some examples, aspects of the operations of 1205 may be performed by an antenna selection component as described with reference to FIGS. 5 through 9.

At 1210, the UE or base station may dynamically select an antenna element capability of the first device for a capability message based on the selecting. The operations of 1210 may be performed according to the methods described herein. In some examples, aspects of the operations of 1210 may be performed by a capability component as described with reference to FIGS. 5 through 9.

At 1215, the UE or base station may transmit the capability message for the first device, where the capability message indicates that the first device is capable of operating the selected subset of antenna elements. The operations of 1215 may be performed according to the methods described herein. In some examples, aspects of the operations of 1215 may be performed by a capability component as described with reference to FIGS. 5 through 9.

At 1220, the UE or base station may communicate with the second device over the communication link using the selected subset of antenna elements and based on the capability message. The operations of 1220 may be performed according to the methods described herein. In some examples, aspects of the operations of 1220 may be performed by a communication component as described with reference to FIGS. 5 through 9.

Figure 13:
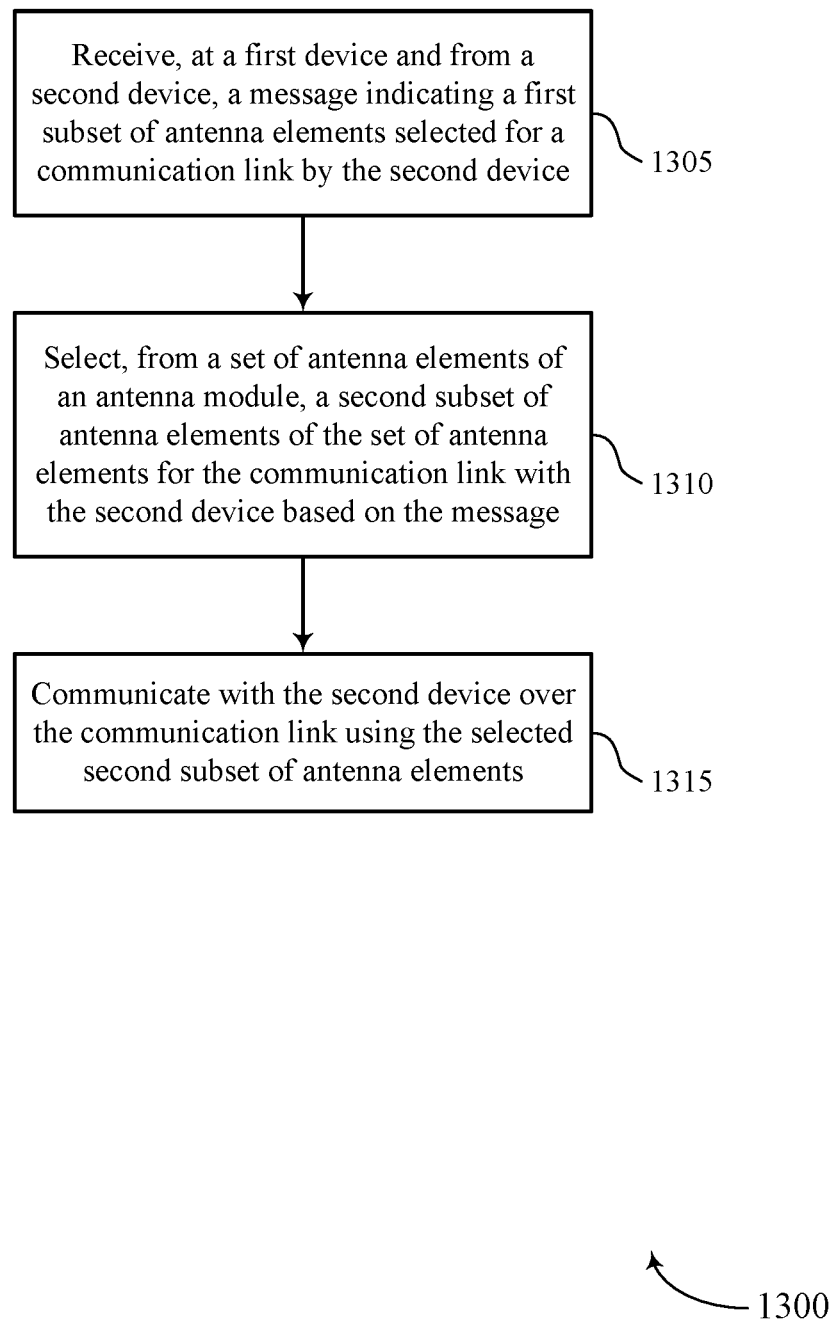

FIG. 13 shows a flowchart illustrating a method 1300 that supports antenna array reconfiguration at both ends of an mmW link in accordance with aspects of the present disclosure. The operations of method 1300 may be implemented by a UE 115, a base station 105, or components of a UE 115 or base station 105 as described herein. For example, the operations of method 1300 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station (e.g., a first device) may receive, from a second device, a message indicating a first subset of antenna elements selected for a communication link by the second device. The operations of 1305 may be performed according to the methods described herein. In some examples, aspects of the operations of 1305 may be performed by an indication reception component as described with reference to FIGS. 5 through 9.

At 1310, the UE or base station may select, from a set of antenna elements of an antenna module, a second subset of antenna elements of the set of antenna elements for the communication link with the second device based on the message. The operations of 1310 may be performed according to the methods described herein. In some examples, aspects of the operations of 1310 may be performed by an antenna selection component as described with reference to FIGS. 5 through 9.

At 1315, the UE or base station may communicate with the second device over the communication link using the selected second subset of antenna elements. The operations of 1315 may be performed according to the methods described herein. In some examples, aspects of the operations of 1315 may be performed by a communication component as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first device, comprising:
    selecting, from a plurality of antenna elements of an antenna module, a subset of antenna elements of the plurality of antenna elements for a communication link with a second device;
    transmitting, to the second device, a message indicating a number of the selected subset of antenna elements; and
    communicating with the second device over the communication link using the selected subset of antenna elements and based at least in part on the message.

2. The method of claim 1, wherein selecting the subset of antenna elements comprises:
    selecting the subset of antenna elements based at least in part on a link budget threshold for the communication link.

3. The method of claim 1, wherein transmitting the message comprises:
    transmitting a request message for the second device to modify an antenna element configuration at the second device based at least in part on the selected subset of antenna elements at the first device.

4. The method of claim 3, further comprising:
    receiving, from the second device in response to the request message, a confirmation message indicating that the second device modified the antenna element configuration at the second device based at least in part on the selected subset of antenna elements at the first device.

5. The method of claim 4, wherein the communicating with the second device over the communication link using the selected subset of antenna elements is based at least in part on receiving the confirmation message.

6. The method of claim 3, wherein the request message indicates a requested number of antenna elements for the second device to use for the communication link.

7. The method of claim 1, wherein transmitting the message comprises:
transmitting a capability message for the first device, wherein the capability message indicates that the first device is capable of operating the number of the selected subset of antenna elements.

8. The method of claim 7, further comprising:
dynamically selecting an antenna element capability of the first device for the capability message based at least in part on the selecting.

9. The method of claim 1, further comprising:
determining to select the subset of antenna elements based at least in part on a power availability at the first device, a power availability at the second device, a thermal constraint at the first device, a thermal constraint at the second device, an interference constraint at the first device, an interference constraint at the second device, a power amplifier rating at the first device, a power amplifier rating at the second device, an exposure constraint at the first device, an exposure constraint at the second device, a millimeter wave component rating at the first device, a millimeter wave component rating at the second device, a beamwidth constraint of a beam used with the subset of antenna elements at the first device, a beamwidth constraint of a beam used with a second subset of antenna elements at the second device, an angular spread estimate of one or more dominant clusters at the first device, an angular spread estimate of one or more dominant clusters at the second device, or a combination thereof.

10. The method of claim 1, wherein the plurality of antenna elements is controlled by a plurality of radio frequency integrated circuits for the antenna module, and selecting the subset of antenna elements comprises:
operating a subset of radio frequency integrated circuits of the plurality of radio frequency integrated circuits to control the selected subset of antenna elements.

11. The method of claim 1, wherein communicating with the second device over the communication link comprises:
receiving, from the second device, one or more messages over the communication link using the selected subset of antenna elements.

12. The method of claim 1, wherein a carrier frequency for the communication link is greater than 52.6 Gigahertz (GHz).

13. The method of claim 1, wherein:
the first device and the second device comprise user equipments (UEs); and
the communication link comprises a sidelink or a relay communication link.

14. The method of claim 1, wherein:
the first device and the second device comprise base stations; and
the communication link comprises a backhaul link or a relay communication link.

15. A method for wireless communications at a first device, comprising:
receiving, from a second device, a message indicating a number of a first subset of antenna elements selected for a communication link by the second device;
selecting, from a plurality of antenna elements of an antenna module, a second subset of antenna elements of the plurality of antenna elements for the communication link with the second device based at least in part on the message; and
communicating with the second device over the communication link using the selected second subset of antenna elements.

16. The method of claim 15, wherein selecting the second subset of antenna elements comprises:
selecting the second subset of antenna elements based at least in part on a link budget threshold for the communication link and the first subset of antenna elements.

17. The method of claim 15, wherein receiving the message comprises:
receiving a request message for the first device to modify an antenna element configuration at the first device based at least in part on the first subset of antenna elements, wherein the second subset of antenna elements is selected based at least in part on the request message.

18. The method of claim 17, further comprising:
transmitting, to the second device in response to the request message, a confirmation message indicating that the first device modified the antenna element configuration at the first device based at least in part on selecting the second subset of antenna elements.

19. The method of claim 17, wherein:
the request message indicates a requested number of antenna elements for the first device to use for the communication link; and
the selected second subset of antenna elements comprises the requested number of antenna elements.

20. The method of claim 15, wherein receiving the message comprises:
receiving a capability message for the second device, wherein the capability message indicates that the second device is capable of operating the number of the first subset of antenna elements.

21. The method of claim 15, further comprising:
modifying a transmit power for the communication link based at least in part on the first subset of antenna elements and the selected second subset of antenna elements.

22. The method of claim 15, further comprising:
communicating with the second device over the communication link using a first number of antenna elements;
determining that the second device reduced a number of operating antenna elements for the communication link based at least in part on the indicated first subset of antenna elements; and
selecting, for the second subset of antenna elements for the communication link, a second number of antenna elements that is greater than the first number of antenna elements based at least in part on the second device reducing the number of operating antenna elements for the communication link.

23. The method of claim 15, further comprising:
communicating with the second device over the communication link using a first number of antenna elements;
determining that the second device increased a number of operating antenna elements for the communication link based at least in part on the indicated first subset of antenna elements; and
selecting, for the second subset of antenna elements for the communication link, a second number of antenna elements that is less than the first number of antenna elements based at least in part on the second device increasing the number of operating antenna elements for the communication link.

24. The method of claim 15, wherein the plurality of antenna elements is controlled by a plurality of radio frequency integrated circuits for the antenna module, and selecting the second subset of antenna elements comprises:
operating a subset of radio frequency integrated circuits of the plurality of radio frequency integrated circuits to control the selected second subset of antenna elements.

25. The method of claim 15, wherein communicating with the second device over the communication link comprises:
transmitting, to the second device, one or more messages over the communication link using the selected second subset of antenna elements.

26. The method of claim 15, wherein a carrier frequency for the communication link is greater than 52.6 Gigahertz (GHz).

27. The method of claim 15, wherein:
the first device and the second device comprise user equipments (UEs); and
the communication link comprises a sidelink or a relay communication link.

28. The method of claim 15, wherein:
the first device and the second device comprise base stations; and
the communication link comprises a backhaul link or a relay communication link.

29. An apparatus for wireless communications at a first device, comprising:
a processor;
memory coupled with the processor; and
instructions stored in the memory and executable by the processor to cause the apparatus to:
select, from a plurality of antenna elements of an antenna module, a subset of antenna elements of the plurality of antenna elements for a communication link with a second device;
transmit, to the second device, a message indicating a number of the selected subset of antenna elements; and
communicate with the second device over the communication link using the selected subset of antenna elements and based at least in part on the message.

30. An apparatus for wireless communications at a first device, comprising:
a processor;
memory coupled with the processor; and
instructions stored in the memory and executable by the processor to cause the apparatus to:
receive, from a second device, a message indicating a number of a first subset of antenna elements selected for a communication link by the second device;
select, from a plurality of antenna elements of an antenna module, a second subset of antenna elements of the plurality of antenna elements for the communication link with the second device based at least in part on the message; and
communicate with the second device over the communication link using the selected second subset of antenna elements.

* * * * *